US011714830B2

(12) United States Patent
Li et al.

(10) Patent No.: US 11,714,830 B2
(45) Date of Patent: *Aug. 1, 2023

(54) MECHANISMS FOR MULTI-DIMENSION DATA OPERATIONS

(71) Applicant: Convida Wireless, LLC, Wilmington, DE (US)

(72) Inventors: Qing Li, Princeton Junction, NJ (US); Xu Li, Plainsboro, NJ (US)

(73) Assignee: Convida Wireless, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/810,421

(22) Filed: Jul. 1, 2022

(65) Prior Publication Data

US 2022/0335065 A1 Oct. 20, 2022

Related U.S. Application Data

(63) Continuation of application No. 15/749,646, filed as application No. PCT/US2016/045777 on Aug. 5, 2016, now Pat. No. 11,468,095.

(60) Provisional application No. 62/201,835, filed on Aug. 6, 2015.

(51) Int. Cl.
  *G06F 16/28* (2019.01)
  *H04W 4/70* (2018.01)
  *G06F 16/22* (2019.01)

(52) U.S. Cl.
  CPC ............ *G06F 16/283* (2019.01); *G06F 16/22* (2019.01); *H04W 4/70* (2018.02)

(58) Field of Classification Search
  None
  See application file for complete search history.

(56) References Cited

U.S. PATENT DOCUMENTS

| | | |
|---|---|---|
| 2004/0248083 A1 | 12/2004 | Mikkelsen et al. |
| 2006/0117057 A1 | 6/2006 | Legault et al. |
| 2006/0248083 A1 | 11/2006 | Sack et al. |
| 2008/0301155 A1 | 12/2008 | Borgsmidt |
| 2011/0153603 A1 | 6/2011 | Adiba et al. |
| 2015/0339369 A1 | 11/2015 | Rais-Ghasem et al. |
| 2016/0019294 A1 | 1/2016 | Dong et al. |
| 2016/0045777 A1 | 2/2016 | Haggard et al. |
| 2017/0006135 A1 | 1/2017 | Siebel et al. |
| 2017/0039038 A1 | 2/2017 | Huber et al. |

OTHER PUBLICATIONS

Anonymous. "IoT Hackathon Data Access Options", Nov. 17, 2014, pp. 1-76.
Anonymous: "InfluxDB", Apr. 19, 2015, Retrieved from the Internet at URL:hhp://www.slideshare.net/NicolasMuller/devoxx-france-2015-influxdb.

(Continued)

*Primary Examiner* — Eddy Cheung
(74) *Attorney, Agent, or Firm* — BakerHostetler

(57) ABSTRACT

Mechanisms for multidimensional data modeling and operations and related procedures are described. Resource structures for multidimensional data can be used. This can allow lumped operations such as RESTful operations and procedures on the multidimensional data. A new attribute "SamplingPeriodCovered" can be used to indicate the time interval when the related time series data (or any multi-dimension data streams) are stored. This can reduce the total size of the data stored.

17 Claims, 20 Drawing Sheets

(56) References Cited

OTHER PUBLICATIONS

Druid: "Druid / Documentation", Jun. 26, 2015, Retrieved from the Internet at URL:https://web.archive.org/web/20150626194604/http://druidio/docs/latest/ingestion/realtime-ingestion.html.
OneM2M Technical Specification TS-0001-V1.6.1, "Functional Architecture", Jan. 30, 2015, 321 pages.
OneM2M Technical Specification TS-0004-V1.0.1, "Service Layer Core Protocol Specification" Jan. 30, 2015, 217 pages.
OneM2M Technical Specification TS-0007-V2.0.0 "Service Components", Aug. 30, 2016, 229 pages.
OneM2M White Paper "The Interoperability Enabler for the Entire M2M and IoT Ecosystem" Jan. 2015, 14 pages.
Shawn Moe: "2014 IBM Corporation Informix: Intelligent Database for the Internet of Things", Oct. 20, 2014, Retrieved from the Internet at URL:https://www.ibm.com/developerworks/community/wikis/form/anonymous.

FIG. 15B

MECHANISMS FOR MULTI-DIMENSION DATA OPERATIONS

CROSS REFERENCE TO RELATED APPLICATIONS

This application is a continuation of U.S. patent application Ser. No. 15/749,646, filed Feb. 1, 2018, which is the National Stage Application filed under 35 U.S.C. § 371 of International Application No. PCT/US2016/045777 filed Aug. 5, 2016, which claims the benefit of U.S. Provisional Patent Application Ser. No. 62/201,835, filed Aug. 6, 2015, the disclosures of which are hereby incorporated by reference as if set forth in their entireties.

BACKGROUND

In recent years M2M solutions enabling machines/devices to communicate with each other have been developed for the healthcare sector, the energy sector, and the automotive sector. The next step of optimization is to provide solutions integrating machines and things from different sectors on the same platforms.

oneM2M was launched in 2012 as a global initiative to ensure efficient deployment of Machine-to-Machine (M2M) communications systems and the Internet of Things (IoT).

oneM2M's aim is to develop technical specifications for a common M2M Service Layer that can be embedded within various hardware and software to connect the wide range of devices worldwide with M2M application servers.

For this purpose, a single set of standards defining a horizontal platform for the exchange and the sharing of data among applications independent of industry sectors has been initiated by oneM2M. "oneM2M is creating a distributed software layer—like an operating system—which is facilitating that unification by providing a framework for inter-working with different technologies.". As shown in FIG. 1, this distributed software layer is implemented in a common service layer 102 that sits between the M2M applications 104 and the communication HW/SW that provides data transport (network services layer 106).

The Service Layer is enabled functionally by Common Services Functions (CSFs). A group of CSFs may be instantiated as a group on Common Services Entities (CSEs) 102 as shown in FIG. 2. Examples of CSFs and their functionality include:

Application and Service Layer Management CSF 202: provides management of AEs and CSEs. This includes capabilities to configure, troubleshoot and upgrade functions of the CSE, as well as to upgrade the AEs Discovery CSF 204: searches for information about applications and services based on a filter criteria.

Registration CSF 206: Provides the functionality for AEs (or other remote CSEs) to register with a CSE. This allows the AEs (or the remote CSE) to use the services of the CSE.

Communication Management/Delivery Handling CSF 208: provides communications with other CSEs, AEs and NSEs. This CSF decides at what time and which communication connection for delivering communications and if necessary and allowed, to buffer communications request so that they can be forwarded at a later time.

Group Management CSF 210: provides for the handling of group related requests. Enables an M2M system to support bulk operations on multiple devices, applications, etc.

Security CSF 212: provides security functions for the service layer, such as access control including identification, authentication, and authorization.

Data Management and Repository CSF 214: provides data storage and mediation functions (collecting data for aggregation, re-formatting data, and storing data for analytics and semantic processing).

Location CSF 216: provides the functionality to enable AEs to obtain geographical location information.

Service Charging & Accounting CSF 218: provides charging functions for the service layer Device Management CSF 220: provides management of device capabilities on M2M gateways and M2M devices.

Network Service Exposure, Service Execution and Triggering CSF 222: manages communications with the Underlying Networks for accessing network service functions Subscription and Notification CSF 224: provides functionality to allow for subscribing to an event and to be notified when this event occurs.

The oneM2M architecture provides for a CSE to interface through the Mca, Mcc (and Mcc'), and Mcn reference points (respectively) with Application Entities (AE); other CSEs; Network Service Entity (NSE), i.e. the underlying network oneM2M uses two architectural approaches to develop the service layer architectural specifications: Resource Oriented Architecture (ROA) shown in FIG. 3A and Service Oriented Architecture (SOA) shown in FIG. 3B, The ROA architecture is developed around resources and the operations performed by CSFs to enable their functionality. Resources are architectural elements uniquely addressable via Uniform Resource Identifiers (Urns).

Resources may be viewed as a hierarchical trees, emanating from a base, with a number of relationships defined among them. For example, a resource may contain child resource(s) and attribute(s), the child resource having a containment relationship with a parent resource. Therefore, the parent resource representation contains references to its child resources(s). The lifetime of a child-resource is limited by the parent's resource lifetime.

Attributes are architectural elements that store information of the resource. oneM2M defines a set of attributes common to all resources, and others are specific to individual resources and are referred to as "resource specific attributes". Resources located at one CSE (referred to as Hosting CSE) may be announced to remote CSEs, and these are referred to "announced resources." The announced resources may contain attributes of the original resource as well as their own attributes. Synchronization between the original resource and the announced resource, is the responsibility of the Hosting CSE.

The SOA architecture is developed around the services themselves and may be used in legacy deployments that are not RESTful based. The SOA service layer contains various M2M services which may be grouped into service components. In addition to the existing reference points introduced in the ROA architecture, the SOA architecture introduces the inter-service reference point Msc.

Entities in the oneM2M System, such as AEs, CSEs, data, etc. are represented as resources. A resource structure is specified as a representation of such resources. Such resources are uniquely addressable.

oneM2M identifies the following three categories of resources:

Normal resources include the complete set of representations of data which constitutes the base of the information to be managed.

A virtual resource or a virtual attribute is used to trigger processing and/or retrieve results, but they do not have a permanent representation in a CSE.

An announced resource is a resource at a remote CSE that is linked to the original resource that has been announced, and it maintains some of the characteristics of the original resource. Resource announcement can facilitate resource discovery. The announced resource at a remote CSE can also be used for creating child resources at the remote CSE that are not present as children of the original resource or are not announced children of the original resource.

The <container> resource 402 represents a container for data instances. It is used to share information with other entities and potentially to track the data. A <container> resource 402 has no associated content. It has only attributes and child resources.

FIG. 4 illustrates the structure of the <container> resource 402. The <container> resource 402 contains the child resources specified in Table 1.

TABLE 1

Child resources of <container> resource

| Child Resources of <container> | Child Resource Type | Multiplicity | Description | <containerAnnc> Child Resource Type |
|---|---|---|---|---|
| semanticDescriptor | <semanticDescriptor> | 0 . . . n | >See clause 9.6.30 of oneM2M-TS-0001 | <semanticDescriptor>, <semanticDescriptorAnnc> |
| [variable] | <contentInstance> | 0 . . . n | See clause 9.6.7 of oneM2M-TS-0001 | <contentInstance>, <contentInstanceAnnc> |
| [variable] | <subscription> | 0 . . . n | See clause 9.6.8 of oneM2M-TS-0001 | <subscription> |
| [variable] | <container> | 0 . . . n | See clause 9.6.6 of oneM2M-TS-0001 | <container> <containerAnnc> |
| latest | <latest> | 1 | See clause 9.6.27 of oneM2M-TS-0001 | None |
| oldest | <oldest> | 1 | See clause 9.6.28 of oneM2M-TS-0001 | None |

The <container> resource 402 contains the attributes specified in Table 2.

TABLE 2

Attribute of <container> resource

| Attributes of <container> | Multiplicity | RW/ RO/ WO | Description | <containerAnnc> Attributes |
|---|---|---|---|---|
| resourceType | 1 | RO | See clause 9.6.1.3 of oneM2M-TS-0001where this common attribute is described. | NA |
| resourceID | 1 | RO | See clause 9.6.1.3 of oneM2M-TS-0001where this common attribute is described. | MA |
| resourceName | 1 | WO | See clause 9.6.1.3 of oneM2M-TS-0001 where this common attribute is described. | MA |
| parentID | 1 | RO | See clause 9.6.1.3 of oneM2M-TS-0001 where this common attribute is described. | NA |
| expirationTime | 1 | RW | See clause 9.6.1.3 v where this common attribute is described. | MA |
| accessControlPolicyIDs | 0 . . . 1 (L) | RW | See clause 9.6.1.3 of oneM2M-TS-0001 where this common attribute is described. If no accessControlPolicyIDs are provided at the time of creation, the accessControlPolicyIDs of the parent resource is linked to this attribute | MA |

TABLE 2-continued

Attribute of <container> resource

| Attributes of <container> | Multiplicity | RW/ RO/ WO | Description | <containerAnnc> Attributes |
|---|---|---|---|---|
| labels | 0 . . . 1 (L) | RW | See clause 9.6.1 of oneM2M-TS-0001 where this common attribute is described. | MA |
| creationTime | 1 | RO | See clause 9.6.1.3 of oneM2M-TS-0001 where this common attribute is described. | NA |
| lastModifiedTime | 1 | RO | See clause 9.6.1.3 of oneM2M-TS-0001 where this common attribute is described. | NA |
| stateTag | 1 | RO | See clause 9.6.1.3 of oneM2M-TS-0001 where this common attribute is described. | OA |
| announceTo | 0 . . . 1 (L) | RW | See clause 9.6.1.3 of oneM2M-TS-0001 where this common attribute is described. | NA |
| announcedAttribute | 0 . . . 1 (L) | RW | See clause 9.6.1.3 of oneM2M-TS-0001 where this common attribute is described. | NA |
| creator | 0 . . . 1 | RO | The AE-ID or CSE-ID of the entity which created the resource. | NA |
| maxNrOfInstances | 0 . . . 1 | RW | Maximum number of direct child <contentinstance> resources in the <container> resource. | OA |
| maxByteSize | 0 . . . 1 | RW | Maximum size in bytes of data(i.e., content attribute of a <contentInstance> resource) that is allocated for the <container> resource for all direct child <contentInstance> resources in the <container> resource. | OA |
| maxInstanceAge | 0 . . . 1 | RW | Maximum age of a direct child <contentInstance> resource in the <container> resource. The value is expressed in seconds. | OA |
| currentNrOfInstances | 1 | RO | Current number of direct child <contentInstance> resource in the <container> resource. It is limited by the maxNrOfInstances. | OA |
| currentByteSize | 1 | RO | Current size in bytes of data(i.e., content attribute of a <contentInstance> resource) stored in all direct child <contentInstance> resources of a <container> resource. This is the summation of contentSize attribute values of the <contentInstance> resources. It is limited by the maxNrOfBytes. | OA |

TABLE 2-continued

Attribute of <container> resource

| Attributes of <container> | Multiplicity | RW/ RO/ WO | Description | <containerAnnc> Attributes |
|---|---|---|---|---|
| locationID | 0...1 | RW | An ID of the resource where the attributes/policies that define how location information are obtained and managed. This attribute is defined only when the <container> resource is used for containing location information. | OA |
| ontologyRef | 0...1 | RW | A reference (URI) of the ontology used to represent the information that is stored in the child <contentInstance> resources of the present <container> resource (see note). | OA |

NOTE:

The access to this URI is out of scope of oneM2M.

The <contentInstance> resource 404 represents a data instance in the <container> resource 402. The content of the contentInstance can be encrypted.

An AE can delete a contentInstance resource explicitly or it may be deleted by the platform based on policies. If the platform has policies for contentInstance retention, these shall be represented by the attributes maxByteSize, maxNrOfInstances and/or maxInstanceAge attributes in the <container> resource 402. If multiple policies are in effect, the strictest policy shall apply.

The <contentInstance> resource 404 inherits the same access control policies of the parent <container> resource 402, and does not have its own access ControlPolicyIDs attribute.

The <contentInstance> resource 404 contains the child resources specified in Table 3.

TABLE 3

Child resources of <container> resource

| Child Resources of <contentInstance> | Child Resource Type | Multiplicity | Description | <contentInstanceAnnc> Child Resource Types |
|---|---|---|---|---|
| semanticDescriptor | <semanticDescriptor> | 0...n | See clause 9.6.30 of oneM2M-TS-0001 | <semanticDescriptor>, <semanticDescriptorAnnc> |

The <contentInstance> resource 404 contains the attributes specified in Table 4.

TABLE 4

Attributes of <contentInstance> resource

| Attributes of <contentInstance> | Multiplicity | RW/ RO/ WO | Description | <contentInstanceAnnc> Attributes |
|---|---|---|---|---|
| resourceType | 1 | RO | See clause 9.6.1.3 of oneM2M-TS-0001 where this common attribute is described. | NA |
| resourceID | 1 | RO | See clause 9.6.1.3 of oneM2M-TS-0001 where this common attribute is described. | MA |

TABLE 4-continued

Attributes of <contentInstance> resource

| Attributes of <contentInstance> | Multiplicity | RW/ RO/ WO | Description | <contentInstanceAnnc> Attributes |
|---|---|---|---|---|
| resourceName | 1 | WO | See clause 9.6.1.3 of oneM2M-TS-0001 where this common attribute is described. | MA |
| parentID | 1 | RO | See clause 9.6.1.3 of oneM2M-TS-0001 where this common attribute is described. | NA |
| labels | 0 . . . 1 (L) | WO | See clause 9.6.1.3 of oneM2M-TS-0001 where this common attribute is described. | MA |
| expirationTime | 1 | WO | See clause 9.6.1.3 of oneM2M-TS-0001 where this common attribute is described. | NA |
| creationTime | 1 | RO | See clause 9.6.1.3 of oneM2M-TS-0001 where this common attribute is described. | NA |
| lastModifiedTime | 1 | RO | See clause 9.6.1.3 of oneM2M-TS-0001 where this common attribute is described. | NA |
| stateTag | 1 | RO | See clause 9.6.1.3 of oneM2M-TS-0001 where this common attribute is described. The stateTag attribute of the parent resource should be incremented first and copied into this stateTag attribute when a new instance is added to the parent resource. | OA |
| announceTo | 0 . . . 1 (L) | WO | See clause 9.6.1.3 of oneM2M-TS-0001 where this common attribute is described. | NA |
| announcedAttribute | 0 . . . 1 (L) | WO | See clause 9.6.1.3 of oneM2M-TS-0001 where this common attribute is described. | NA |
| creator | 0 . . . 1 | RO | The AE-ID or CSE-ID) of the entity which created the resource. | NA |
| contentInfo | 0 . . . 1 | WO | Information on the content that is needed to understand the content. This attribute is a composite attribute. It is composed first of an Internet Media Type (as defined in the IETF RFC 6838) describing the type of the data, and second of an encoding information that specifies how to first decode the received content. Both elements of information are separated by a separator defined in oneM2M TS-0004. | OA |
| contentSize | 1 | RO | Size in bytes of the content attribute. | OA |
| ontologyRef | 0 . . . 1 | WO | A reference (URI) of the ontology used to represent the information that is stored in the contentInstances resources of the <container> resource. If this attribute is not present, the contentInstance resource inherits the ontologyRef from the parent <container> resource if present NOTE: Access to this URI is out of scope of oneM2M. | OA |
| content | 1 | WO | Actual content of a contentInstance. This content may be opaque data for understandable with the help of the contentInfo. This may, for example, be an image taken by a security camera, or a temperature measurement taken by a temperature sensor. | OA |

The <semanticDescriptor> resource 502 is used to store a semantic description pertaining to a resource and potentially sub-resources. Such a description may be provided according to ontologies. The semantic information is used by the semantic functionalities of the oneM2M system and is also available to applications or CSEs.

The <semanticDescriptor> resource 502 contains the child resources specified in Table 5.

TABLE 5

Child resources of <semanticDescriptor> resource

| Child Resources of <semanticDescriptor> | Child Resource Type | Multiplicity | Description |
|---|---|---|---|
| [variable | <subscription> | 0 . . . n | See clause 9.6.8 of oneM2M-TS-0001 where the type of this resource is described. |

The <semanticDescriptor> resource 502 shall contain the attributes specified in Table 6.

TABLE 6

Attributes of <semanticDescriptor> resource

| Attributes of <semanticDescriptor> | Multiplicity | RW/RO/WO | Description |
|---|---|---|---|
| resourceType | 1 | RO | See clause 9.6.1.3 of oneM2M-TS-0001 where this common attribute is described |
| resourceID | 1 | RO | See clause 9.6.1.3 of oneM2M-TS-0001 where this common attribute is described. |
| resourceName | 1 | WO | See clause 9.6.1.3 of oneM2M-TS-0001 where this common attribute is described. |
| parentID | 1 | RO | See clause 9.6.1.3 of oneM2M-TS-0001 where this common attribute is described. |
| accessControlPolicyIDs | 0 . . . 1 (L) | RW | See clause 9.6.1.3 of oneM2M-TS-0001 where this common attribute is described |
| creationTime | 1 | RO | See clause 9.6.1.3 of oneM2M-TS-0001 where this common attribute is described |
| expirationTime | 1 | RW | See clause 9.6.1.3 of oneM2M-TS-0001 where this common attribute is described |
| lastModifiedTime | 1 | RO | See clause 9.6.1.3 of oneM2M-TS-0001 where this common attribute is described |
| labels | 0 . . . 1 (L) | RW | See clause 9.6.1.3 of oneM2M-TS-0001 where this common attribute is described |
| creator | 0 . . . 1 | RO | The AE-ID of the entity which created the resource. This can also be the CSE-ID of the IN-CSE if the IN-CSE created the resource. |
| descriptor | 1 | RW | store a semantic description pertaining to a resource and potentially sub-resources. Such a description may be provided according to ontologies |
| ontologyRef | 0 . . . 1 | WO | A reference (URI) of the ontology used to represent the information that is stored in the descriptor attribute. If this attribute is not present, the ontologyRef from the parent resource is used if present. |

RESTful Operations

The general flow that governs the information exchange in oneM2M is based on the use of Request and Response messages within a communication procedure shown below.

FIG. 7 shows a General Communication flow in oneM2M.

This procedure applies to communications between AEs and a CSE (over the Mca reference point) as well as among CSEs (over the Mcc reference point). Depending on the operation carried by the messages, these procedures may manipulate information in standardized resource representations via RESTful methods such as CREATE, RETRIEVE, UPDATE, and DELETE.

Both the request and response messages are specified, and contain mandatory, optional or conditional parameters. Below is a list of request parameters with brief descriptions, full descriptions can be found in oneM2M-TS-0001, oneM2M Functional Architecture V2.2.0.

TABLE 7

Request Parameter List

| | Request message parameter | Operation | | | | |
| --- | --- | --- | --- | --- | --- | --- |
| | | Create | Retrieve | Update | Delete | Notify |
| Mandatory | Operation - operation to be executed | M | M | M | M | M |
| | To - the address of the target resource on the target CSE | M | M | M | M | M |
| | From - the identifier of the message Originator | M | M | M | M | M |
| | Request Identifier - uniquely identifies a Request message | M | M | M | M | M |
| Operation dependent | Content - to be transferred | M | O | M | N/A | M |
| | Resource Type - of resource to be created | M | N/A | N/A | N/A | N/A |
| Optional | Originating Timestamp - when the message was built | O | O | O | O | O |
| | Request Expiration Timestamp - when the request message expires | O | O | O | O | O |
| | Result Expiration Timestamp - when the result message expires | O | O | O | O | O |
| | Operational Execution Time - the time when the specified operation is to be executed by the target CSE | O | O | O | O | O |
| | Response Type - type of response that shall be sent to the Originator | O | O | O | O | O |
| | Result Persistence - the duration for which the reference containing the responses is to persist | O | O | O | O | N/A |
| | Result Content - the expected components of the result | O | O | O | O | N/A |
| | Event Category - indicates how and when the system should deliver the message | O | O | O | O | O |
| | Delivery Aggregation - aggregation of requests to the same target CSE is to be used | O | O | O | O | O |
| | Group Request Identifier - Identifier added to the group request that is to be fanned out to each member of the group | O | O | O | O | O |
| | Filter Criteria - conditions for filtered retrieve operation | N/A | O | O | O | N/A |
| | Discovery Result Type - format of information returned for Discovery operation | N/A | O | N/A | N/A | N/A |

The use of some of the request parameters above, which play an important role in discovery operations, is detailed in the following section.

Similarly, the following table provides a list of response parameters with brief descriptions, full descriptions can be found in oneM2M-TS-0001, oneM2M Functional Architecture V2.2.0.

of accessControlPolicyIDs attribute in case of non-existence shall be performed recursively until a parent with such an attribute is found.

The Receiver 704 verifies that the name for the created resource as suggested as the resourceName attribute in Content parameter, if provided by the Originator 702 in the CREATE Request message, does not already exist among

TABLE 8

Response Parameter List

| Response message parameter/success or not | Response Code = Ack | Response Code = successful: Operation = Create | Response Code = successful: Operation = Retrieve | Response Code = successful: Operation = Update | Response Code = successful: Operation = Delete | Response Code = successful: Operation = Notify | Response Code = unsuccessful: Operation = C, R, U, D, or N |
|---|---|---|---|---|---|---|---|
| Response Code - successful, unsuccessful, ack | M | M | M | M | M | M | M |
| Request Identifier - uniquely identifies a Request message | M | M | M | M | M | M | M |
| Content - to be transferred | O (address of <request> resource if response is ACK of a non-blocking request) | O (The address and/or the content of the created resource) | M (the retrieved resource content or aggregated contents of discovered resources) | O (The content replaced in an existing resource. The content of the new attributes created. The name of the attributes deleted.) | O (The content actually deleted) | N/A | O (Additional error info) |
| To - the identifier of the Originator or the Transit CSE that sent the corresponding non-blocking request | O | O | O | O | O | O | O |
| From - the identifier of the Receiver | O | O | O | O | O | O | O |
| Originating Timestamp - when the message was built | O | O | O | O | O | O | O |
| Result Expiration Timestamp - when the message expires | O | O | O | O | O | N/A | O |
| Event Category - what event category shall be used for the response message | O | O | O | O | O | O | O |
| Status Code - (e.g. authorization timeout, etc.) | O | O | O | O | O | O | O |

The CREATE (C) procedure shall be used by an Originator CSE or AE to create a resource on a Receiver CSE (also called the Hosting CSE).

FIG. 8 shows a general CREATE procedure for all resources which are not related to registration.

Originator 702 requests to create a resource by using the CREAM method.

If the request is allowed by the given privileges, the Receiver 704 creates the resource.

In step 001, of FIG. 8, the Originator 702 sends mandatory parameters and may send optional parameters in Request message for CREATE operation as specified in Table 7.

In step 002 of FIG. 8, the Receiver 704 checks if the Originator 702 has the appropriate privileges for performing the request. Privileges are part of the attribute accessControlPolicyIDs of the targeted resource. In case that such an attribute does not exist, the Receiver 704 shall check the accessControlPolicyIDs of the parent resource. This lookup child resources of the target resource. If no child within the targeted resource exists with the same resourceName as suggested by the Originator 702, use that name for the resource to be created. If a child uses the resourceName already, the Receiver 704 assign a new name which shall be returned to the Originator 702. If the name was not suggested by the Originator 702, assign a name generated by the Receiver 704 to the resource to be created.

The Receiver 704 assigns a Resource-ID to the resource to be created.

The Receiver 704 assigns values for mandatory RO mode attributes of the resource and override values provided for other mandatory attributes, where needed, and where allowed by the resource type definition and if not provided by the Originator 702 itself.

The Receiver 704 assigns a value to the following common attributes
  a) parentID;
  b) creationTime;
  c) expirationTime: if not provided by the Originator 702, the Receiver 704 shall assign the maximum value possible (within the restriction of the Receiver 704 policies). If the value provided by the Originator 702 cannot be supported, due to either policy or subscription restrictions, the Receiver 704 will assign a new value.
d) lastModifiedTime: which is equals to the creation Time;
e) Any other RO (Read Only) attributes within the restriction of the Receiver 704 policies.

The Receiver 704 checks whether a creator attribute is included in the Content parameter of the request. If included, the creator attribute shall not have a value in the Content parameter of the request. If the creator attribute is included in the request and the creator attribute is supported for the type of resource being created, then the Receiver 704 shall to include the creator attribute in the resource to be created. The Receiver 704 shall assign a value equal to the value carried in the from request parameter. In the event that the Originator 702 provides a value for the creator attribute within the request, this request shall be deemed invalid.

On the other hand if the creator attribute is not included in the Content parameter of the request, then the Receiver 704 does not include the creator attribute in the resource to be created.

On successful validation of the Create Request, the Receiver 704 creates the requested resource.

The Receiver 704 checks if the created resource is a child of a parent resource having a stateTag attribute and increment the parent's stateTag if present.

In step 003, of FIG. 8, the Receiver 704 responds with mandatory parameters and may send optional parameters in Response message for CREATE operation as specified in Table 8.

Recently, time series data (i.e. an example of dimension data with two dimentions—time and data) has attracted increasing attention in oneM2M community. The definition of Time Series Data in TS-0001 is as the following:

Time series data is a sequence of data points, typically consisting of successive measurements made over a time interval.

In example of time series data is described as the following series:

(T_1, D_1), (T_2, D_2), . . . , (T_i, D_i), . . .

where D_i is the data sampled or measured at time T_i.

For an IoT application, D_i could be any measurement collected by various IoT devices or sensors, such as temperature sensors, etc., or also could be machine operation status. Therefore (T_i, D_i) constitutes a meaningful data sample.

SUMMARY

Mechanisms for multidimensional data modeling and operations and related procedures are described. Resource structures for multidimensional data can be used. This can allow operations such as RESTful operations and procedures on the multidimensional data.

A new attribute "SamplingPeriodCovered" can be used to indicate the time interval when the related time series data (or any multi-dimension data streams) are stored. This can reduce the total size of the data stored.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with accompanying drawings wherein:

FIGS. 15A-B are diagrams that illustrates a Graphical User Interfaces (GUI) for Pre-configuration Dimension Data.

DETAILED DESCRIPTION OF ILLUSTRATIVE EMBODIMENTS

Abbreviations

AE Application Entity
App Application
ACP Access Control Policy
ASN Application Service Node
CRUD Create, Read, Update, and Delete
CSE Common Service Entity
CSF Common Service Function
DIS Discovery
DMR Data Management and Repository
HW/SW Hardware/Software
IN Infrastructure Node
IoT Internet of Things
M2M Machine-to-Machine MN Middle Node
ROA Resource Oriented Architecture
SOA Service Oriented Architecture
URI Uniform Resource Identifier Definitions Common Service Entity (CSE) oneM2M term for an instantiation of a set of Common Service Functions,
Common Service Function (CSF) oneM2M term for a Service Capability. Capabilities/Functionalities that reside in the common Service Layer.
Hosting CSE Can be a CSE which hosts various resources (oneM2M name for a Hosting Node)
Hosting Node Can be a M2M Service node which hosts various resources. The hosted resources can be accessed and subscribed by other M2M entities.
M2M Entities Can be any node that participates in M2M communications, in both field and infrastructure domains
M2M Service Node Can be a network node hosting a service layer supporting one or more service capabilities for M2M communication.
Middle Node CSE Can be a CSE in a middle node.
Middle Node Can be a node between a field domain M2M entity and an infrastructure node or entity
Originator 702 Can be the entity that initiates of a Request message for a RESTful operation. For example the CSE where an Originator 702 is trying to perform a resource discovery via RETRIEVE.
Service Capability Can be a specific type of service supported by a service layer
Service Layer Can be a software middleware layer that sits between M2M applications and communication HW/SW that provides data transport. It provides commonly needed functions for M2M applications across different industry segments
Receiver Can be the entity that receives a Request message with a RESTful operation, it processes it and send a corresponding Response message We have identified two problems as follows, please note that those two problems can be studied separately, and therefore, their problem statements and solution descriptions are not related to each other.

Problem 1: The existing oneM2M does not well define resource representations for Multi-Dimension Data and CRUD operation on those data.

Figure 1:
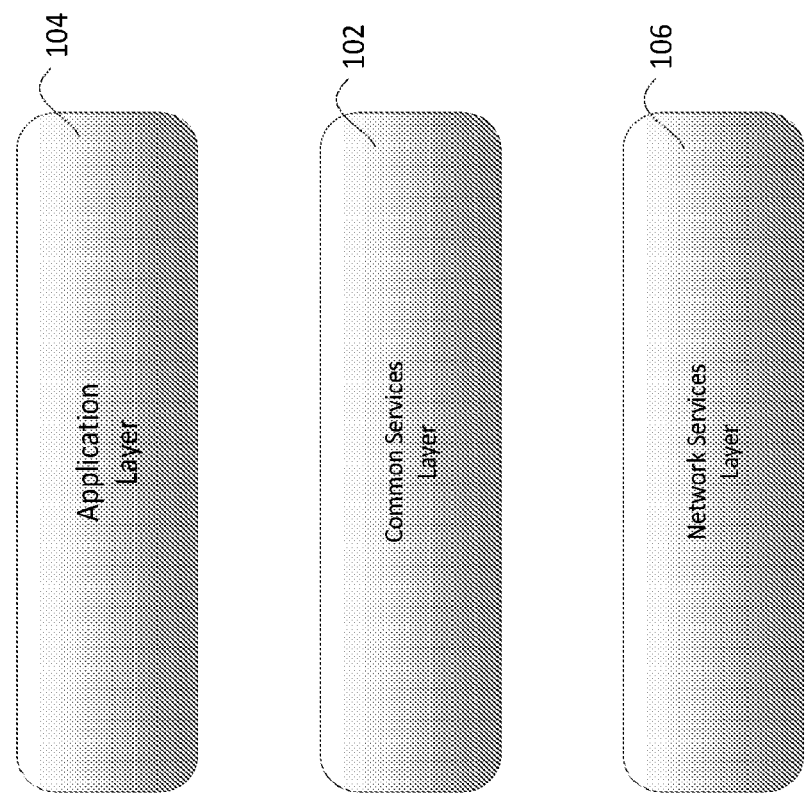
FIG. 1 is a diagram that illustrates a oneM2M Layered Model.
Figure 2:
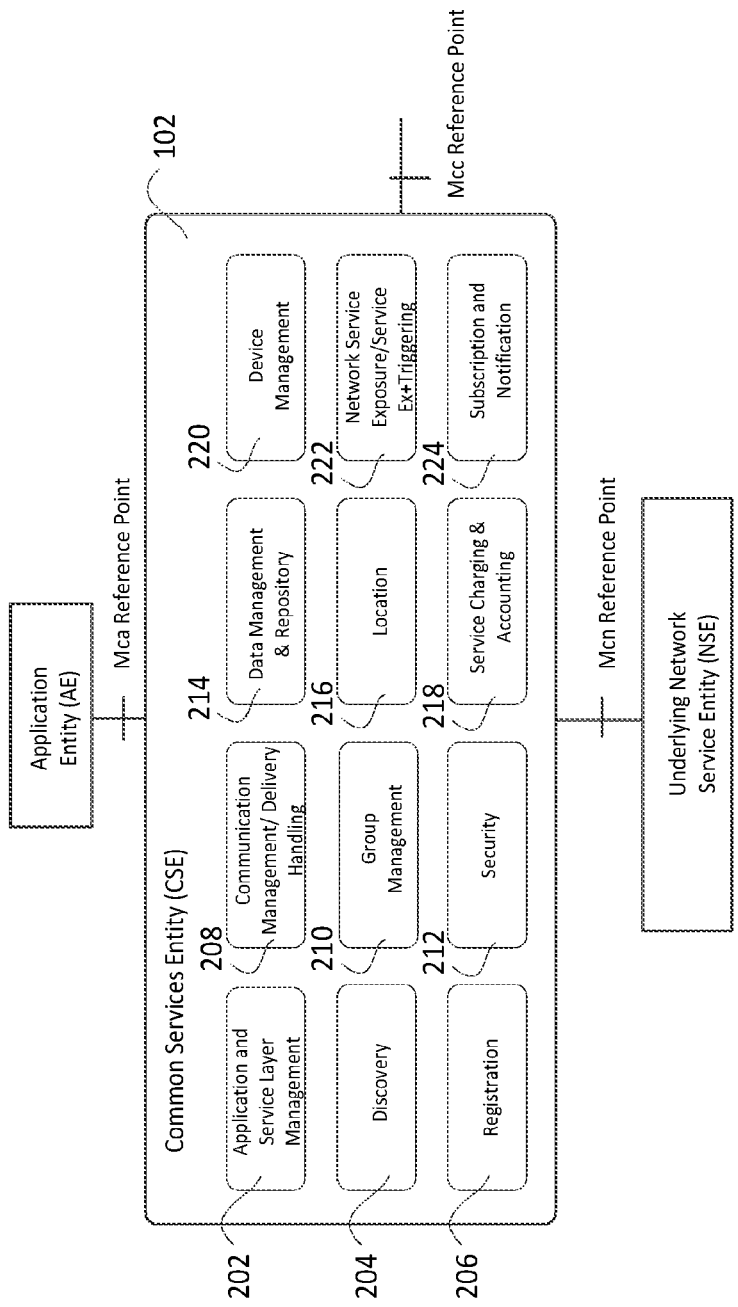
FIG. 2 is a diagram that illustrates Common Services Functions.
Figure 3A:
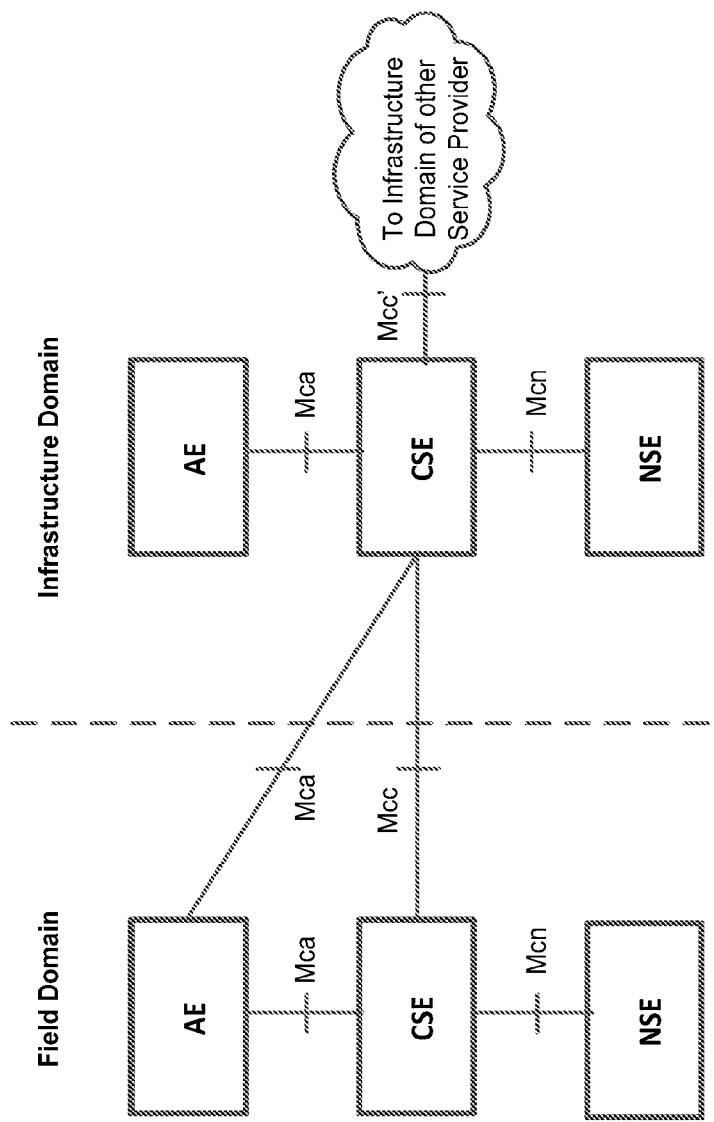
FIGS. 3A and 3B are diagrams that illustrate oneM2M Architectural Approaches.
Figure 3B:
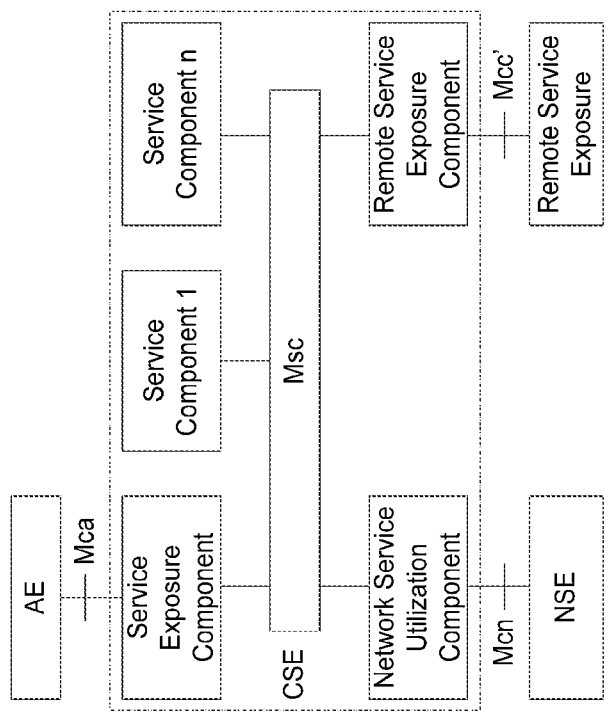
Figure 4:
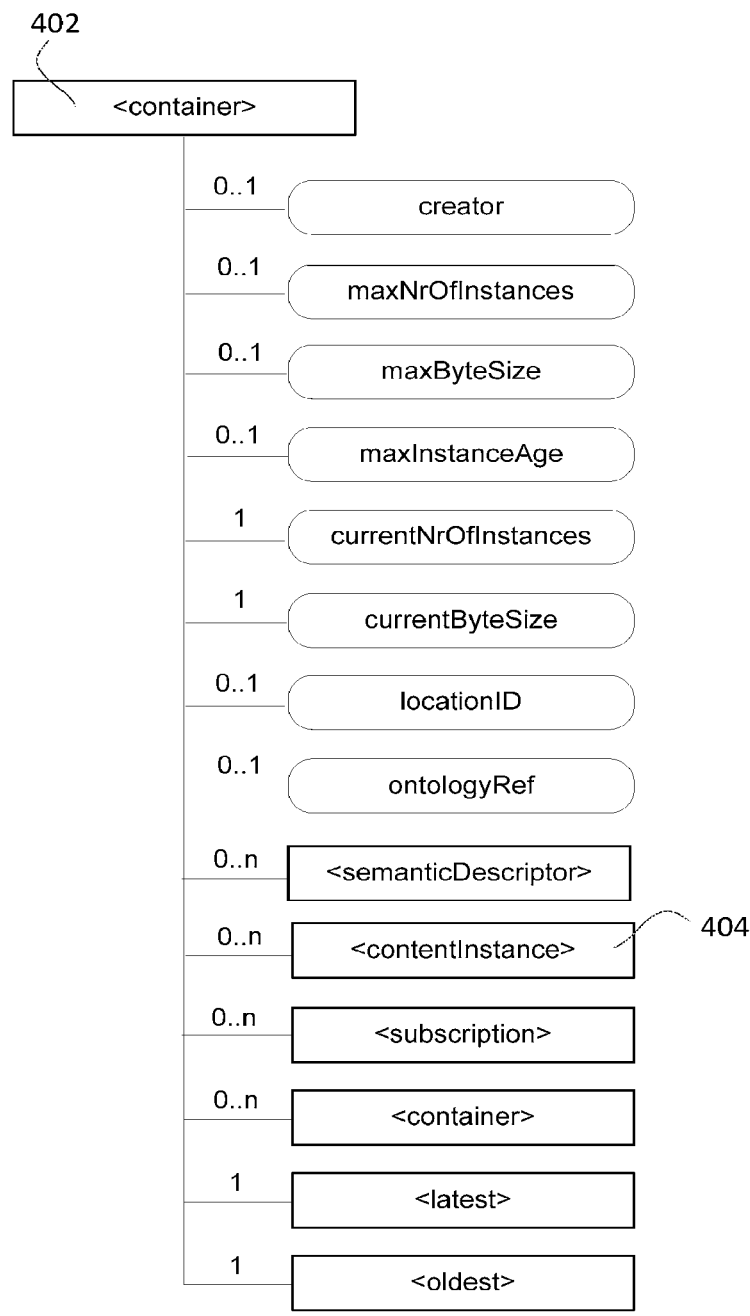
FIG. 4 is a diagram that illustrates the structure of the <container> resource.
Figure 5:
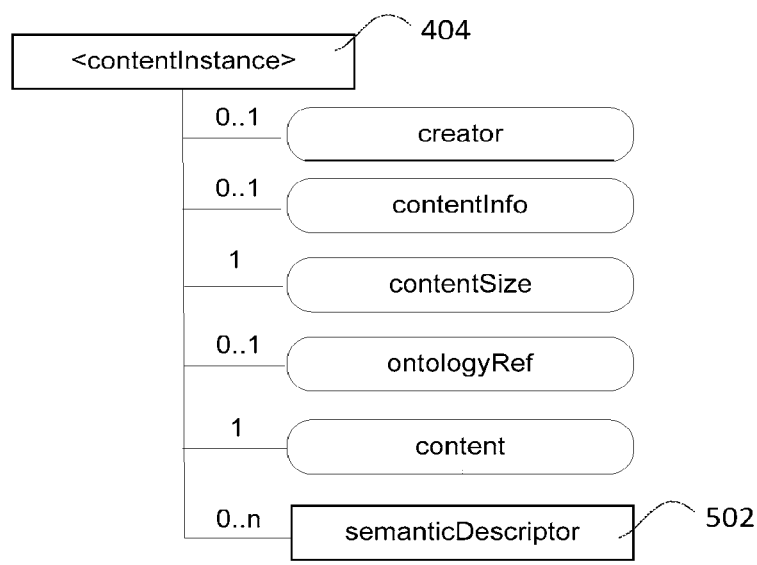
FIG. 5 is a diagram that illustrates a structure of <contentInstance> resource.
Figure 6:
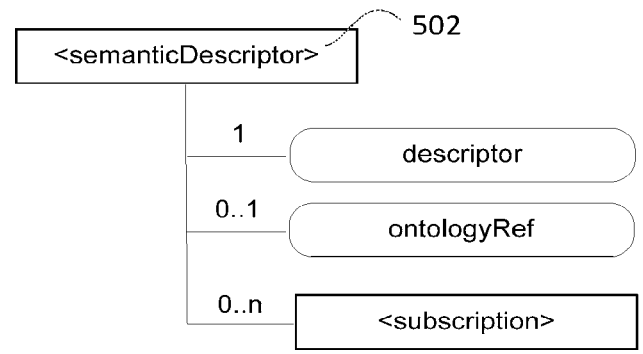
FIG. 6 is a diagram that illustrates a structure of <semanticDescriptor> resource.
Figure 7:
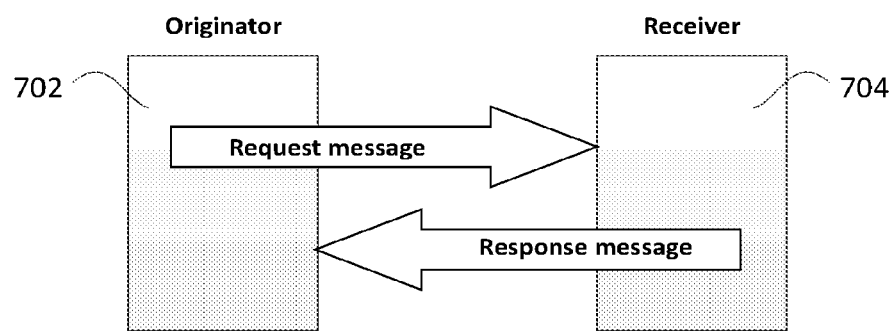
FIG. 7 is a diagram that illustrates a General Communication flow in oneM2M.
Figure 8:
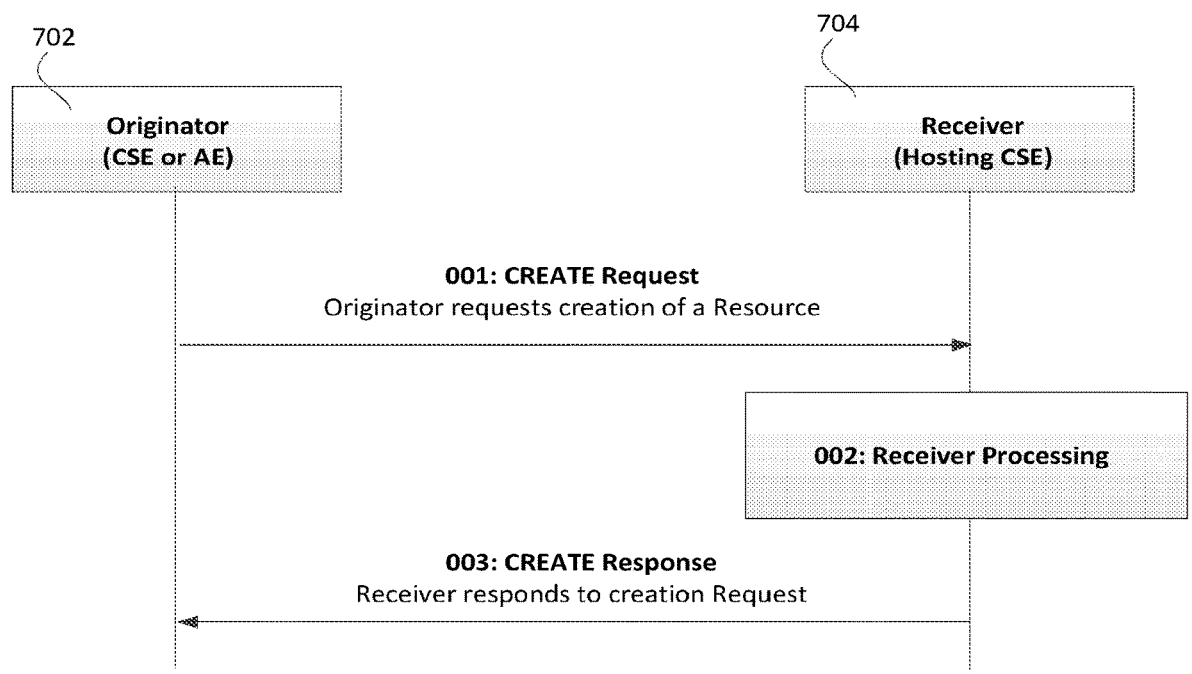
FIG. 8 is a diagram that illustrates a oneM2M CREATE a Resource Procedure.

As shown in FIG. 5, currently in oneM2M the data is modeled with resource content as opaque data for understandable with the help of the contentInfo and the multiplicity for content is always 1. This may, for example, be an image taken by a security camera, or a temperature measurement taken by a temperature sensor. However this cannot present dimension data such as time series data and multiple inputs and/or outputs for ontology model.

More specifically, the problem comes from the fact that in IoT system, a data sample is usually constituted by a number of data units, and each of them could describe a feature on one dimension.

For example, recently, time serials data has attracted increasing attention by oneM2M community. The definition of Time Series Data in TS-0001 is: Time series data is a sequence of data points, typically consisting of successive measurements made over a time interval.

The example of time series data is as follows:
Sample 1=($T\_1$, $D\_1$), Sample 2=($T\_2$, $D\_2$), . . . Sample i=($T\_i$, $D\_i$), . . .
where $D\_i$ is the data sampled or measured at time $T\_i$.

For example, $D\_i$ may be any data sample at time $T\_i$ either measured by various IoT devices or sensors (such as a temperature sensor) or collected by various IoT platforms (such as a machine service platform reporting machine operation status), therefore ($T\_i$, $D\_i$) constitutes a meaningful data sample with certain association or correlation between $T\_i$ and $D\_i$.

It is worth noting that, in above example, there are only two dimensions in a data sample (time and measurement value). However, in a general case, a complete data sample could be constituted with n dimensions. In particular, for a given data sample i, still using the above example, it can be seen that the data items/units on each dimension are correlated, e.g., $T\_i$ is correlated with $D\_i$ since they are associated to constitute data sample i.

Therefore, the data samples having n-dimensions need to be well presented by oneM2M resources. However, the existing <contentInstance> resource 404 stores only a single piece of data value, and cannot represent a "data sample" which is constituted by n data items/units (i.e., having n dimensions). In the meantime, when conducting any CRUD operation on a given data sample, all the related data items/units on each of dimensions should be operated in a synchronized manner. However, the existing oneM2M CRUD procedure only operates on a single piece of data represented by content, instead of operating on data samples with n-dimensional data items/units.

Problem 2: The large amount of IoT data could be data streams, constituted by Multi-Dimension data samples, which often leads to huge data volume. However, the existing oneM2M resource representation does not provide any support for managing storage efficiency and scalability.

Using the Time Series Data as an example, the time series data is usually chronological, dynamical and infinite, which means data samples may be generated very quickly and lead to large volume data consuming considerable system storage capacity. From a big data analytics perspectives, recently a popular paradigm for big data analytics in IoT is called streaming analytics, in which the data can be generated very rapidly and be analysed on-the-fly (i.e. the time series data can be exactly regarded as data streams). In particular, a popular standpoint is that such data streams may not need to be stored in the system for ever, considering both its usefulness and necessity, as well as the huge volume associated with it. A similar example is the on-board video recording system for drivers in which the camera consistently records the road condition while running on the road, but the captured video may be kept for a limited time period and be deleted periodically due to the limited storage of those on-board cameras.

Therefore, from streaming analytics as well as storage efficiency perspective, it is identified that the time series data or streaming data in IoT system sometimes may not be necessarily stored for a long time at the service layer. However, with the current oneM2M resource model, there is no way 1) to indicate the time interval during which the related series data are stored in the system (Note that, such information is very useful, since it gives users a general characteristic about the related time series data before users intends to really access those data); 2) to enable users to set or configure how long they would like to store the time series data in the past.

Resource Structure of Dimension Data (for solving Problem 1)

Resource Structure of Dimension Data—option1

Figure 9:
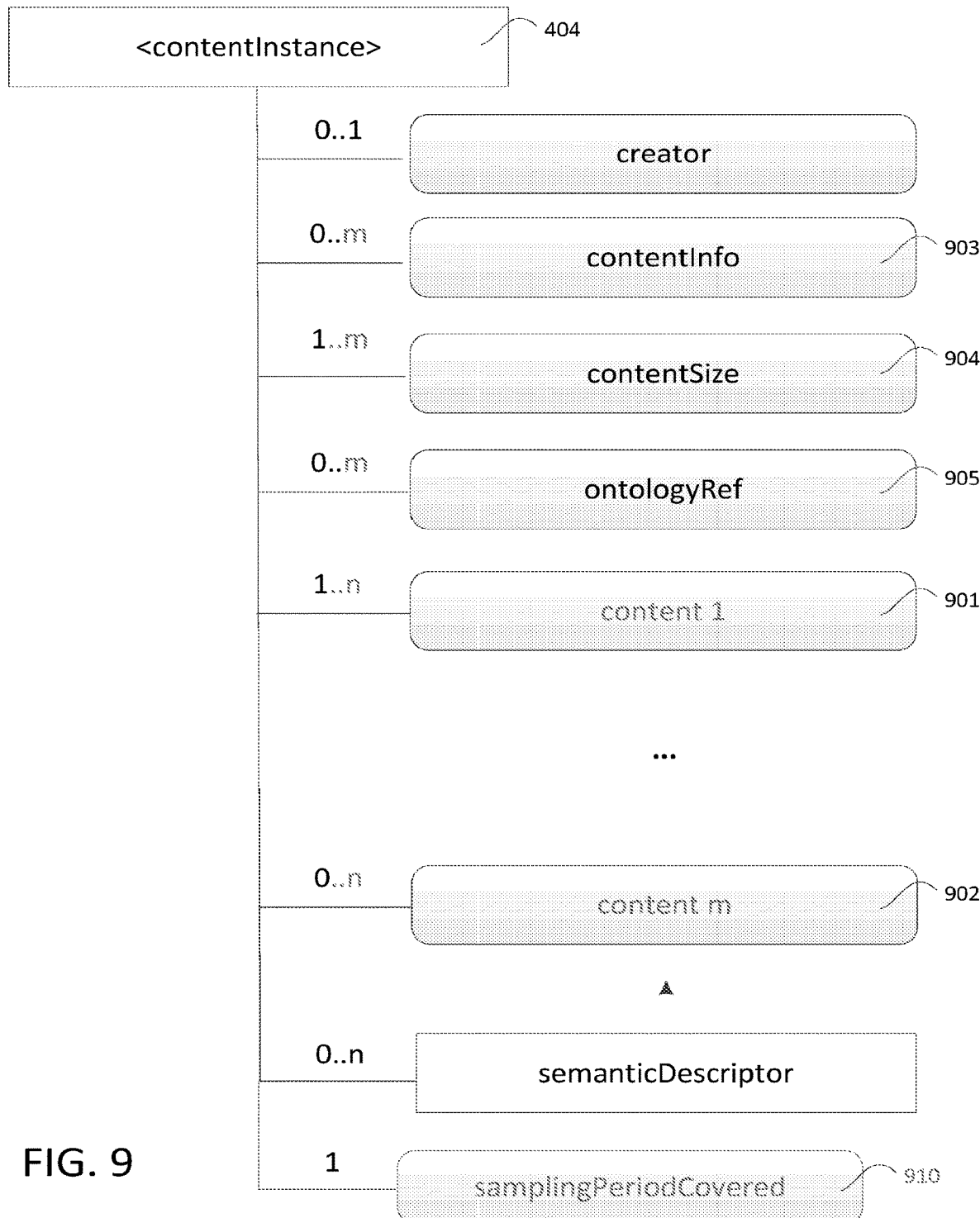
FIGS. 9 and 10 are diagrams that illustrate structures of <contentInstance> resource.

As shown in FIG. 9, we propose m dimensions for data which is represented by content 1 901 and content m 902 which may contain 1 to n elements (e.g. data samples), and the information about each dimension is described by contentInfo 903 and contentSize 904. Also the ontologyRef 905 is extended to each dimension with the multiplicity of 0 . . . m. The details are summarized in Table 9. A samplingPeriodCovered attribute 910 described below with respect to FIG. 10 can also be used.

Resource Structure of Dimension Data—Option2

Figure 10:
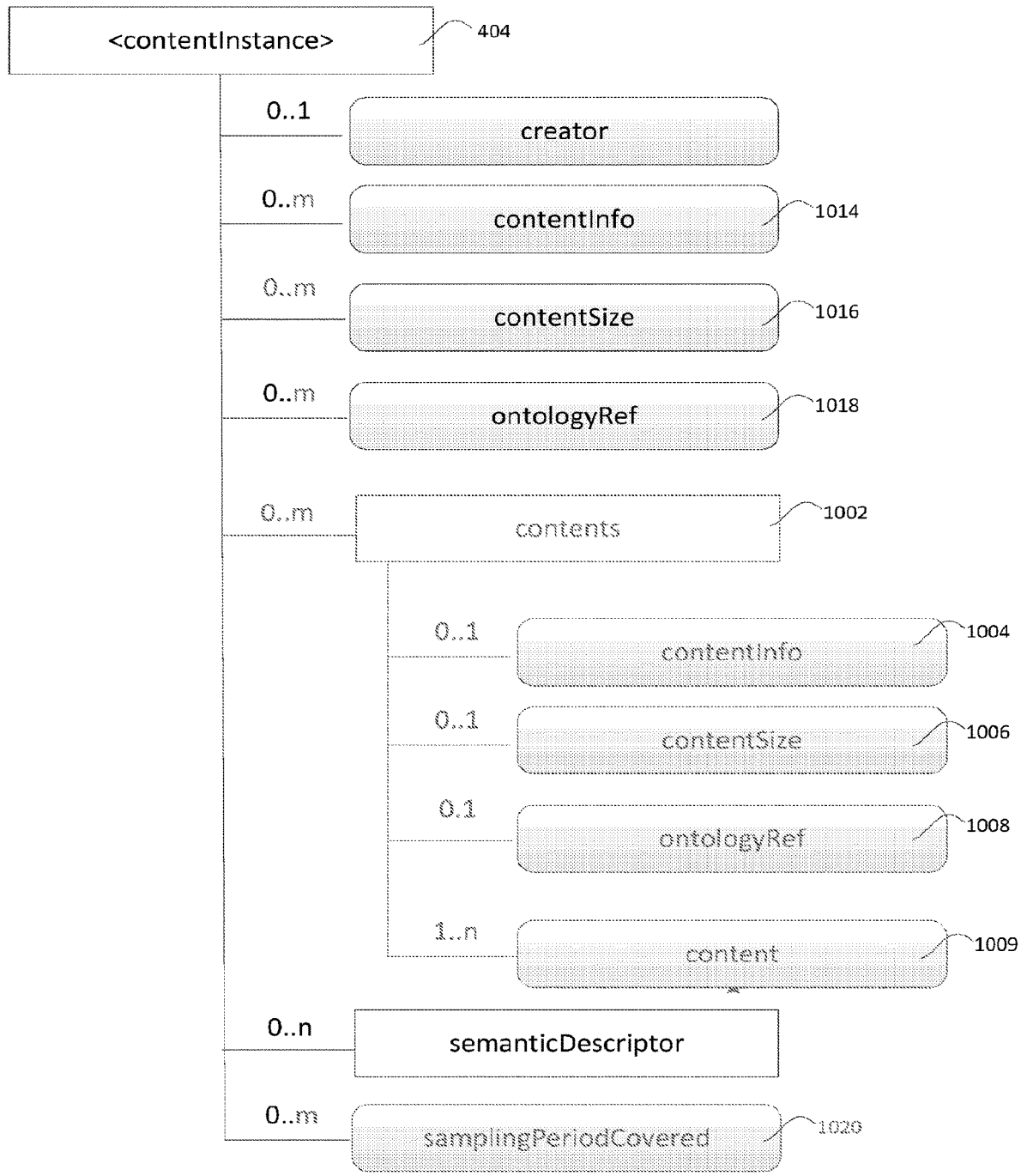

As shown in FIG. 10, we propose 0 to m subresources "contents" 1002 under container "contentInstance" 404 for m-dimention data, and the information about each dimension is described by contentInfo and contentSize either under contentInstance (e.g. contentInfo (0 . . . m) 1014 and

TABLE 9

Attributes of <contentInstance> Resource for Dimension Data

| Attributes of <contentInstance> | Multiplicity | RW/ RO/ WO | Description | <contentInstanceAnnc> Attributes |
|---|---|---|---|---|
| resourceType | 1 | RO | | NA |
| resourceID | 1 | RO | | MA |
| resourceName | 1 | WO | | MA |
| parentID | 1 | RO | | NA |
| labels | 0 . . . 1 (L) | WO | | MA |
| expirationTime | 1 | WO | | NA |
| creationTime | 1 | RO | | NA |
| lastModifiedTime | 1 | RO | | NA |
| stateTag | 1 | RO | | OA |
| announceTo | 0 . . . 1 (L) | WO | | NA |
| announcedAttribute | 0 . . . 1 (L) | WO | | NA |
| creator | 0 . . . 1 | RO | The AE-ID or CSE-ID of the entity which created the resource. | NA |
| contentInfo | 0 . . . m | WO | Information on the content, . . . , content m respectively that is needed to understand each content. This attribute is a composite attribute. It is composed first of an Internet Media Type (as defined in the IETF RFC 6838) describing the type of the data, and second of an encoding information that specifies how to first decode the received content. Both elements of information are separated by a separator defined in oneM2M TS-0004. | OA |
| contentSize | 1 . . . m | RO | Size in bytes of each content attribute. | OA |
| ontologyRef | 0 . . . m | WO | A reference (URI) of the ontology used to represent the m-dimension data (i.e. content 1, . . . , content m) that is stored in the contentInstances resources of the <container> resource if present. | OA |
| Content1 | 1 . . . n | WO | Actual data content of a contentInstance. This content may be dimension-1 opaque data for understandable with the help of the contentInfo. This may, for example, be an image taken by a security camera, or a temperature measurement taken by a temperature sensor. This content may contain one or n elements. | OA |
| Content m | 0 . . . n | WO | Actual data content of a contentInstance, This content may be dimension-m opaque data for understandable with the help of the contentInfo. This may, for example, be time sample(s) corresponding to the image or temperature data contained in content1, or location(s) corresponding to the image or temperature data contained in content1. | OA | contentSize (0 . . . m)) 1016 or under each contents subresource 1002 (e.g. contentInfo (0 . . . 1) 1004 and contentSize (0 . . . 1) 1006). The mth dimension data is represented by the content 1009 under the mth contents sub-resource 1002. Also the ontologyReif is extended to each dimension with the multiplicity of 0 . . . m under contentInstance (i.e. ontologyRef 1018) or under each contents sub-resource (e.g. ontologyRef (0 . . . 1) 1008).

RESTful Operations for Dimension Data (for solving Problem 1)

For m-dimension data, if the association or correlation among the dimensions is required, then one single operation should be applied to the data samples of all dimensions, i.e. the full set of {content 1, content 2, . . . , content m}. The RESTful operations described above are fully applicable to the dimension data content with the extensions to content highlighted in bold in Table 10 and Table 11 for this scenario.

Otherwise, if no association or correlation among the dimensions is required, individual operation may be applied to each dimension data sample separately, e.g. a CREATE is applied to the mth dimension data sample (i.e. "content m") only.

TABLE 10

Request Parameter List for Dimension Data

| | Request message parameter | Operation | | | | |
|---|---|---|---|---|---|---|
| | | Create | Retrieve | Update | Delete | Notify |
| Mandatory | Operation - operation to be executed | M | M | M | M | M |
| | To - the address of the target resource on the target CSE | M | M | M | M | M |
| | From - the identifier of the message Originator | M | M | M | M | M |
| | Request Identifier - uniquely identifies a Request message | M | M | M | M | M |
| Operation dependent | Content 1, . . . , Content m - to be transferred | M | O | M | N/A | M |
| | Resource Type - of resource to be created | M | N/A | N/A | N/A | N/A |
| Optional | Originating Timestamp - when the message was built | O | O | O | O | O |
| | Request Expiration Timestamp - when the request message expires | O | O | O | O | O |
| | Result Expiration Timestamp - when the result message expires | O | O | O | O | O |
| | Operational Execution Time - the time when the specified operation is to be executed by the target CSE | O | O | O | O | O |
| | Response Type - type of response that shall be sent to the Originator | O | O | O | O | O |
| | Result Persistence - the duration for which the reference containing the responses is to persist | O | O | O | O | N/A |
| | Result Content - the expected components of the result | O | O | O | O | N/A |
| | Event Category - indicates how and when the system should deliver the message | O | O | O | O | O |
| | Delivery Aggregation- aggregation of requests to the same target CSE is to be used | O | O | O | O | O |
| | Group Request Identifier - Identifier added to the group request that is to be fanned out to each member of the group | O | O | O | O | O |
| | Filter Criteria - conditions for filtered retrieve operation | N/A | O | O | O | N/A |
| | Discovery Result Type - format of information returned for Discovery operation | N/A | O | N/A | N/A | N/A |

TABLE 11

Response Parameter List for Dimension Data

| Response message parameter/success or not | Response Code = Ack | Response Code = successful: Operation = Create | Response Code = successful: Operation = Retrieve | Response Code = successful: Operation = Update | Response Code = successful: Operation = Delete | Response Code = successful: Operation = Notify | Response Code = unsuccessful: Operation = C, R, U, D, or N |
|---|---|---|---|---|---|---|---|
| Response Code - successful, unsuccessful, ack | M | M | M | M | M | M | M |
| Request Identifier - uniquely identifies a Request message | M | M | M | M | M | M | M |
| Content 1, . . . , Content m - to be transferred | O (address of <request> resource if response is ACK of a non-blocking request) | O (The address and/or the content 1, . . . , content m of the created resource) | M (the retrieved resource content 1, . . . , content m or aggregated contents of discovered resources) | O (The content 1, . . . , content m replaced in an existing resource. The content 1, . . . , content m of the new attributes created. The name of the attributes deleted.) | O (The content 1, . . . , content m actually deleted) | N/A | O (Additional error info) |
| To - the identifier of the Originator or the Transit CSE that sent the corresponding non-blocking request | O | O | O | O | O | O | O |
| From - the identifier of the Receiver | O | O | O | O | O | O | O |
| Originating Timestamp - when the message was built | O | O | O | O | O | O | O |
| Result Expiration Timestamp - when the message expires | O | O | O | O | O | N/A | O |
| Event Category - what event category shall be used for the response message | O | O | O | O | O | O | O |
| Status Code - (e.g. authorization timeout, etc.) | O | O | O | O | O | O | O |

Figure 11:
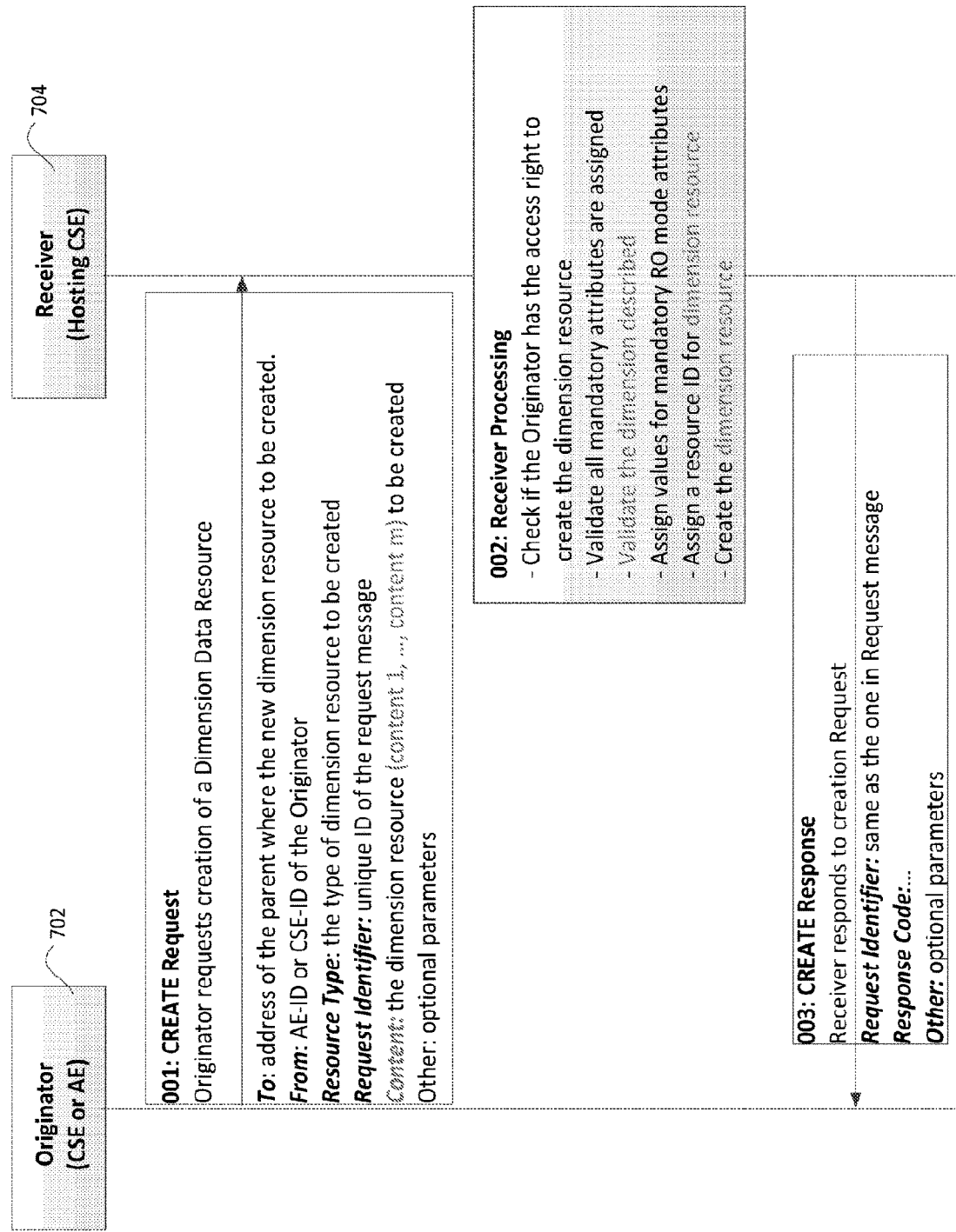
FIG. 11 is a diagram that illustrates a CREATE a Dimension Resource Procedure.

An example of creating a dimension data resource is illustrated in FIG. 11. In step 001, a create request is sent from originator 702 to receiver 704 with m-dimension content (i.e. content 1, content 2, . . . , content m). In step 002, the receiver 704 processes the multidimensional data. For example, in step 002, receiver 704 validates the dimension of the multidimensional data. In this example, if too much or too little data is sent for one dimension (e.g. dimension $m^{th}$) an error message can be produced. Also a resource ID is assigned by Receiver 704 for dimension data (i.e. {content 1, content 2, . . . , content m}) to be created at Receiver 704. In step 003, a response is sent from the receiver 704 to the originator 702 which may contain dimension data info as described in Table 11 for CREATE operation.

Figure 16A:
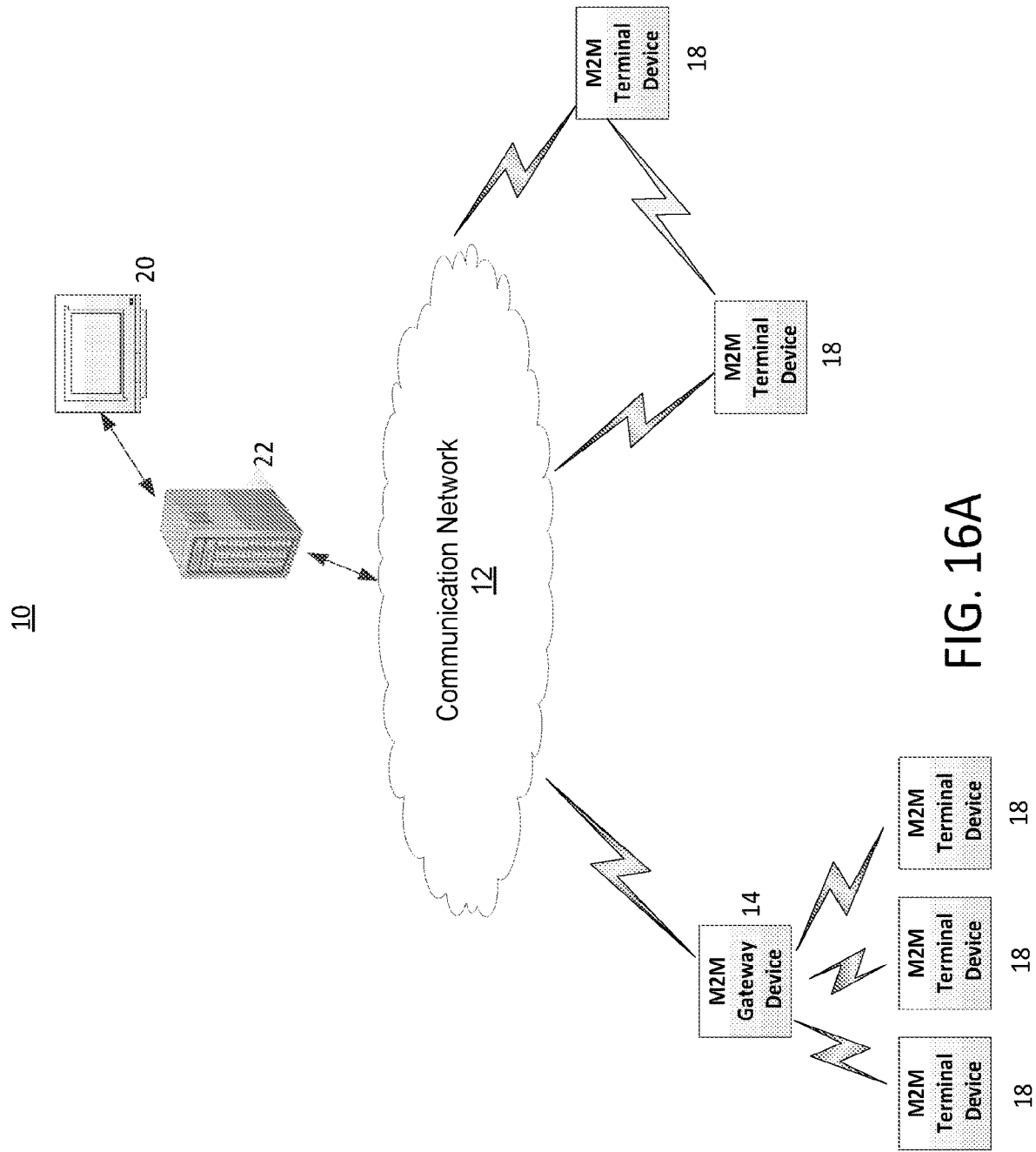
FIG. 16A is a diagram of a M2M/IoT/WoT communication system that includes a communication network.
Figure 16B:
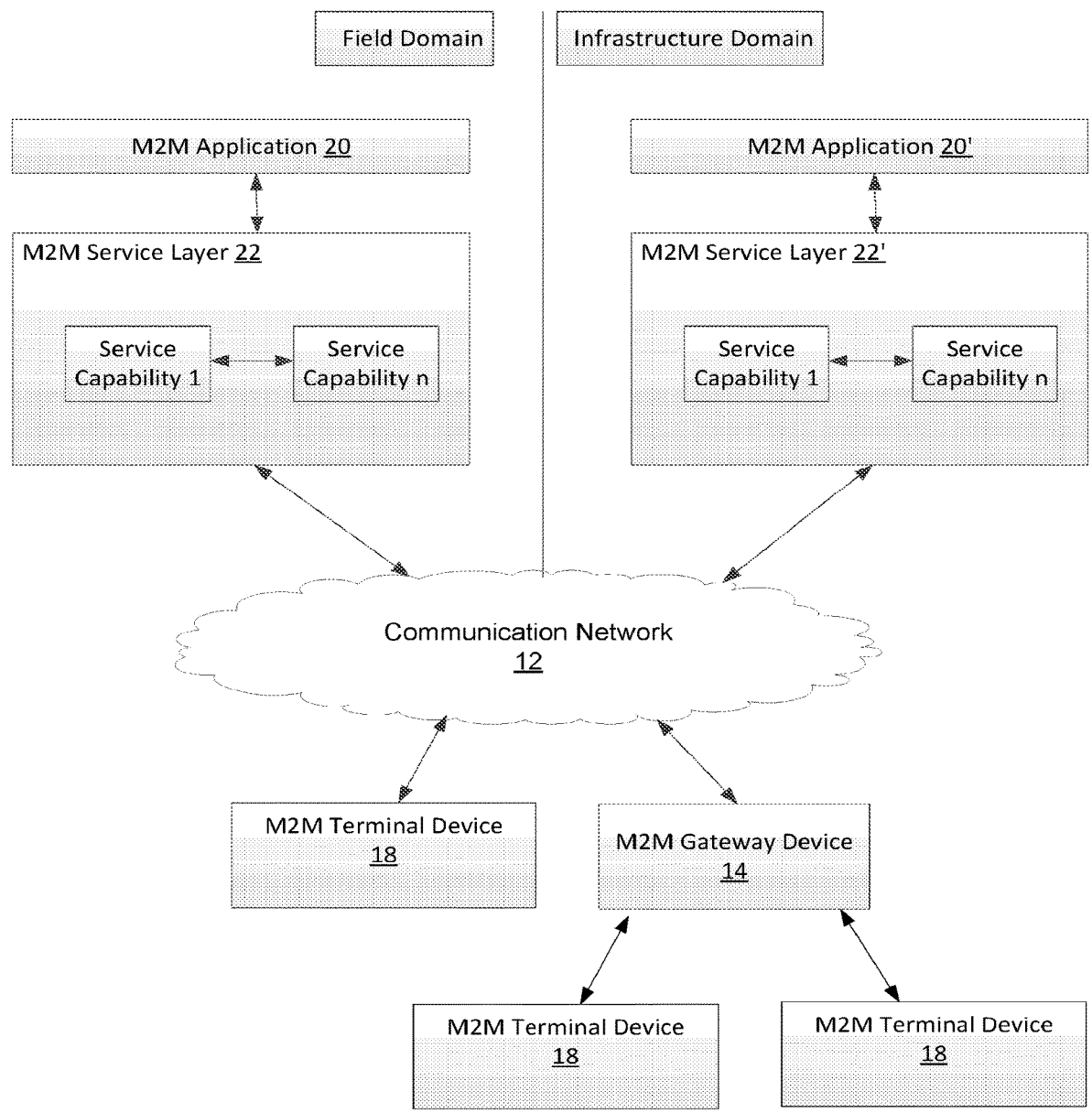
FIG. 16B is a diagram of an illustrated M2M service layer in the field domain that provides services for the M2M application, M2M gateway devices, and M2M terminal devices and the communication network.
Figure 16C:
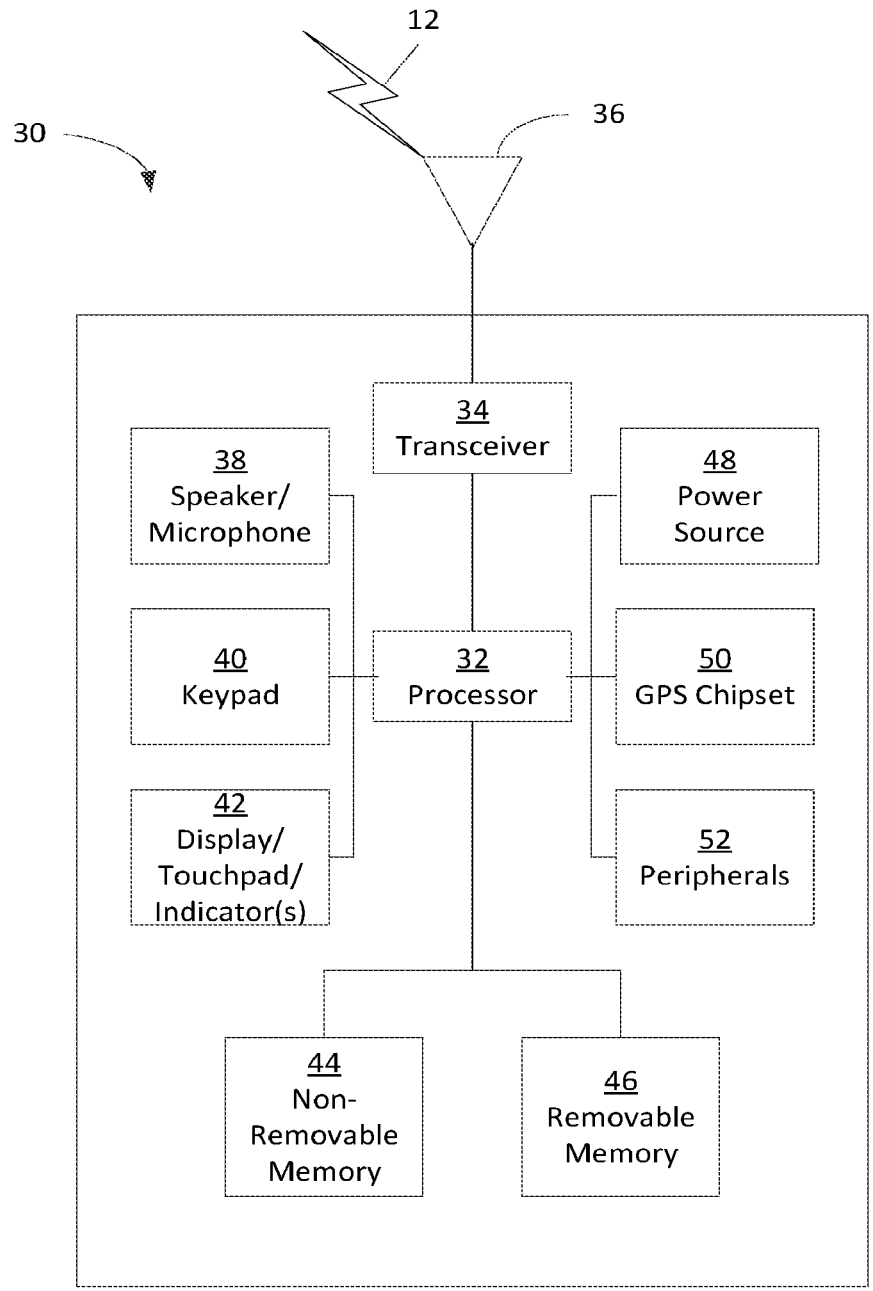
FIG. 16C is a diagram of an exemplary device that may be used to implement any of the network nodes described herein.
Figure 16D:
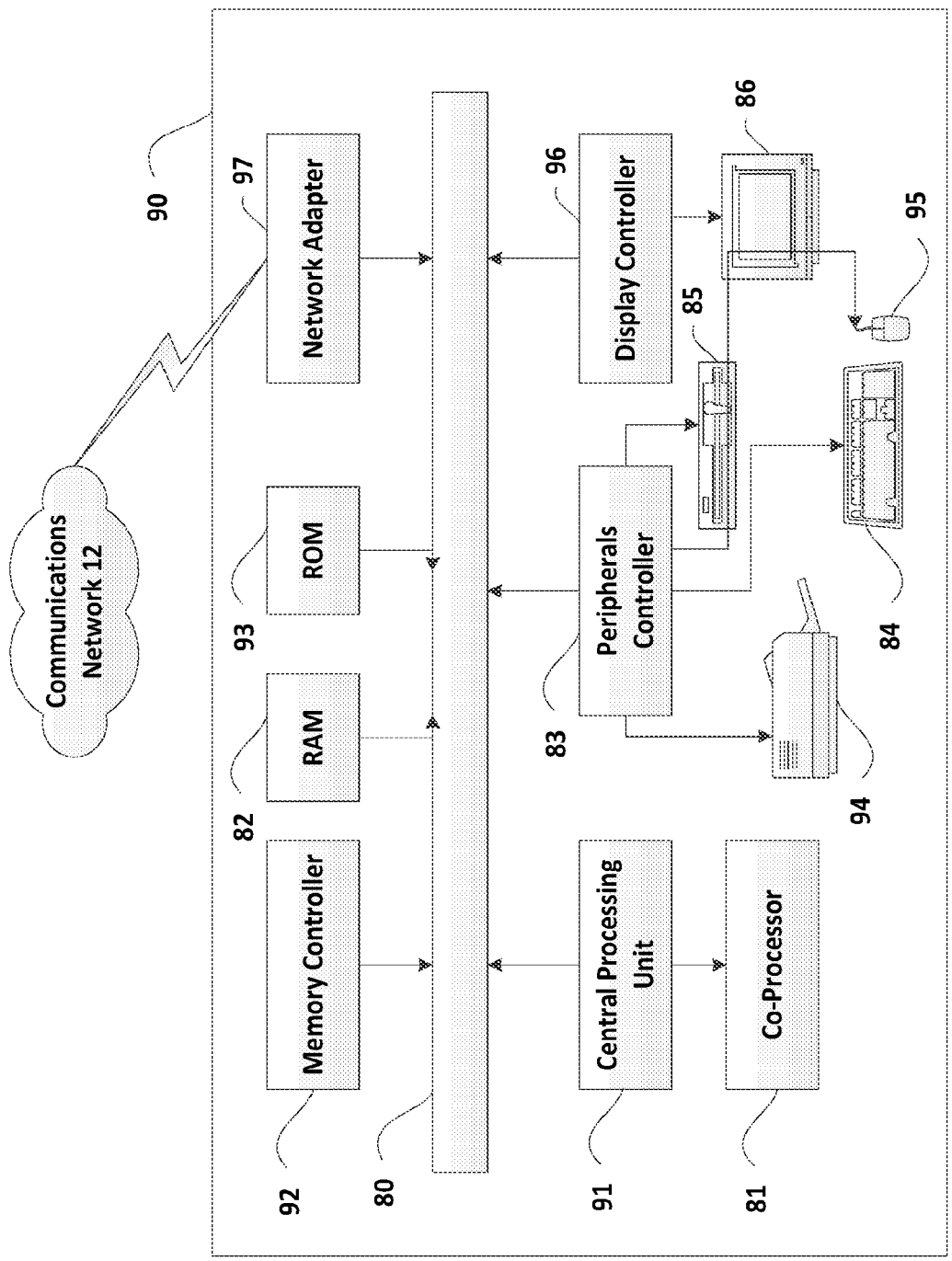
FIG. 16D is a block diagram of a computer system or server that may be used to implement any of the network nodes described herein.

It is understood that the entities performing the steps illustrated in FIG. 11 are logical entities that may be implemented in the form of software (i.e., computer-executable instructions) stored in a memory of, and executing on a processor of, a network node or computer system such as those illustrated in FIG. 16C or FIG. 16D. That is, the method(s) illustrated in FIG. 11 may be implemented in the form of software (i.e., computer-executable instructions) stored in a memory of a network node, such as the node or computer system illustrated in FIG. 16C or FIG. 16D, which computer executable instructions, when executed by a processor of the node, perform the steps illustrated in FIG. 11. It is also understood that any transmitting and receiving steps illustrated in FIG. 11 may be performed by communication circuitry of the node under control of the processor of the node and the computer-executable instructions (e.g., software) that it executes. New Attribute Defined "SamplingPeriodCovered" for Solving Problem 2

We propose a new attribute which is called "SamplingPeriodCovered". A data stream in term of a stream of data samples (e.g., the time series data example) are stored within a <contentInstance> resource. Therefore, for the current practice, we propose the <contentInstance> resource 404 can have the newly defined SamplingPeriodCovered attribute 1020 in FIG. 10.

Let's still take the time series data as example, where if the SamplingPeriodCovered is set for a time interval covered for 12 hour, which means that only the time series data that are generated in the latest 12 hours are stored in the system.

In particular, from a procedure perspective, depending on the specific access right policy, a user can conduct CRUD operation on this attribute such as UPDATE in order to control the storage process for multiple dimension data streaming. For example, if SamplingPeriodCovered 1020 is updated to be 2 hours by a UPDATE operation, then only those multiple dimension data that are generated in the latest 2 hours will be stored.

It is worth noting that, to make the idea more general, it is possible that in the future, other resources may be defined for storing multi-dimension data accordingly, no matter what resources to be defined or to be used, we propose that the SamplingPeriodCovered 1020 attribute may always be an attribute of such resources, i.e., not limited to the <contentInstance> resource 404 as considered in this work.

Time Series Data

Figure 12:
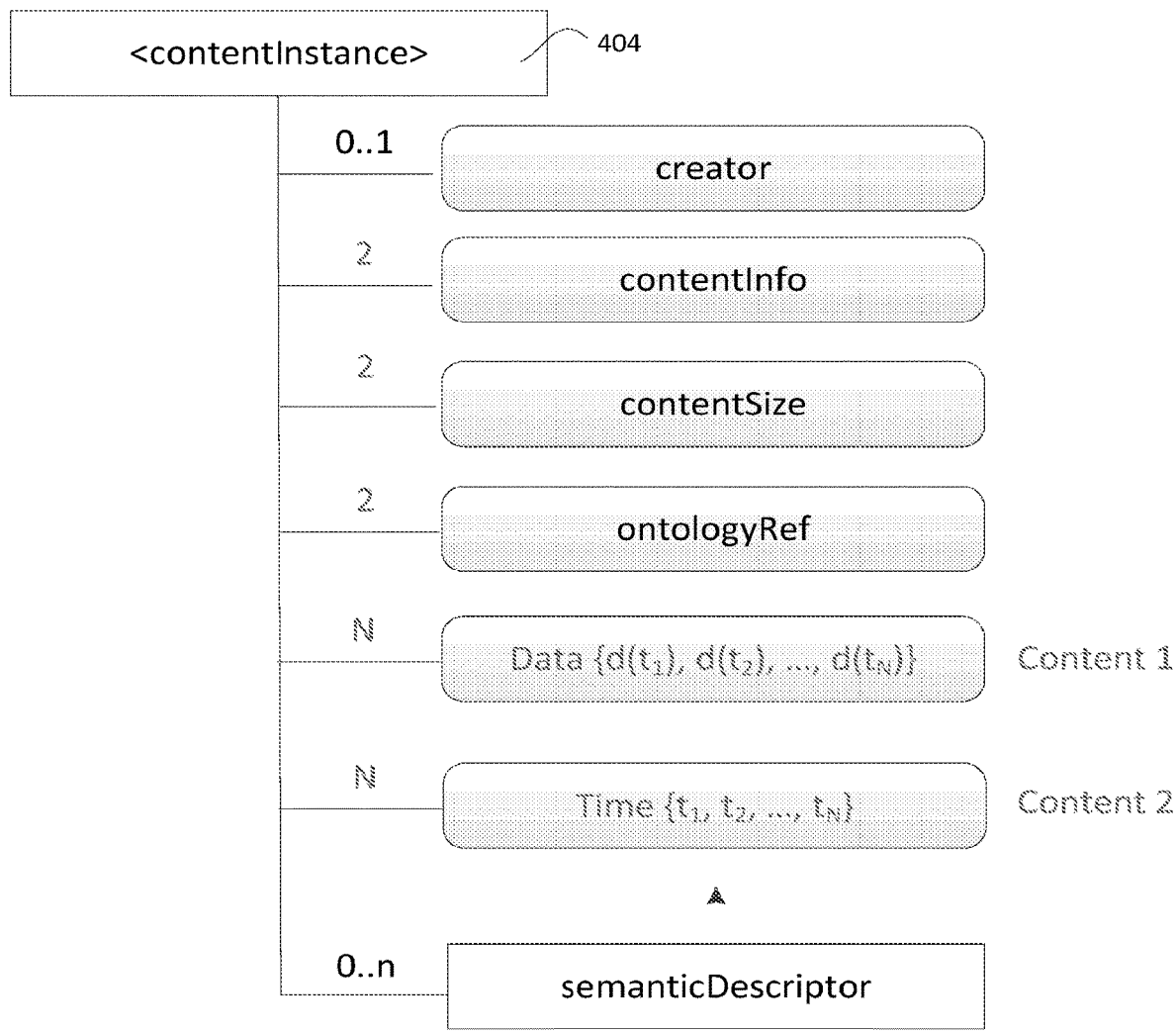
FIGS. 12 and 13 are diagrams that illustrate a Dimension Resource Structure for Time Series.
Figure 13:
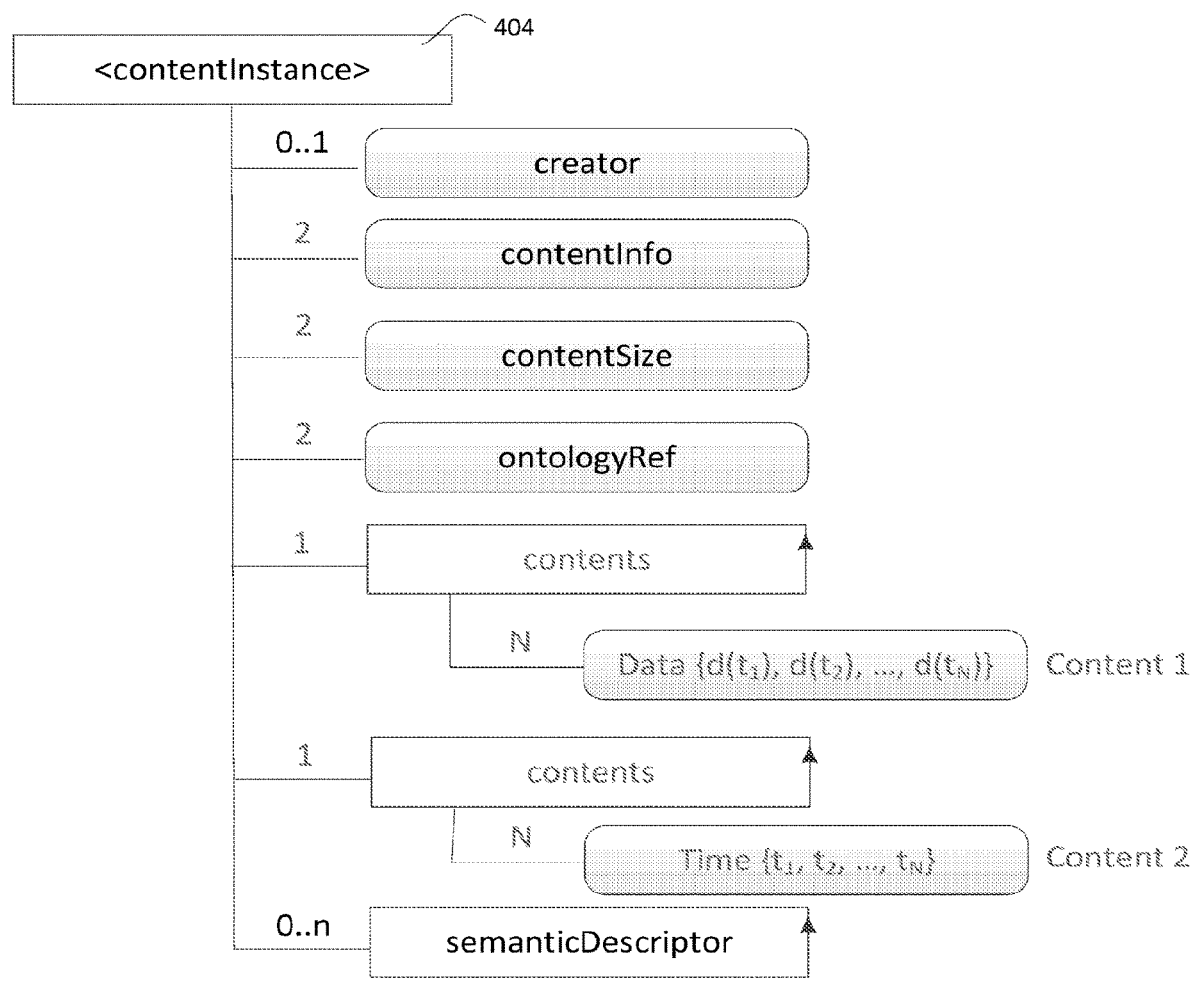

An example of time series data $\{d(t_1), d(t_2), \ldots, d(t_N)\}$ corresponding to time $\{t_2, t_N\}$ is illustrated in FIG. 12 and FIG. 13, where the content 1 is default to data and content 2 is default to time. In this scenario, dimension 1 (i.e. data $\{d(t_1), d(t_2), \ldots, d(t_N)\}$ and dimension 2 (i.e. time $\{t_1, t_2, \ldots, t_N\}$) are strongly associated or correlated, therefore one REASTful (e.g. CREATE, RETRIEVE, UPDATE, DELATE, etc.) operation shall be applied to both dimension contents, i.e. data $\{d(t_1), d(t_2), \ldots, d(t_N)\}$ and time $\{t_1, t_2, \ldots, t_N\}$.

Ontology Model

Figure 14:
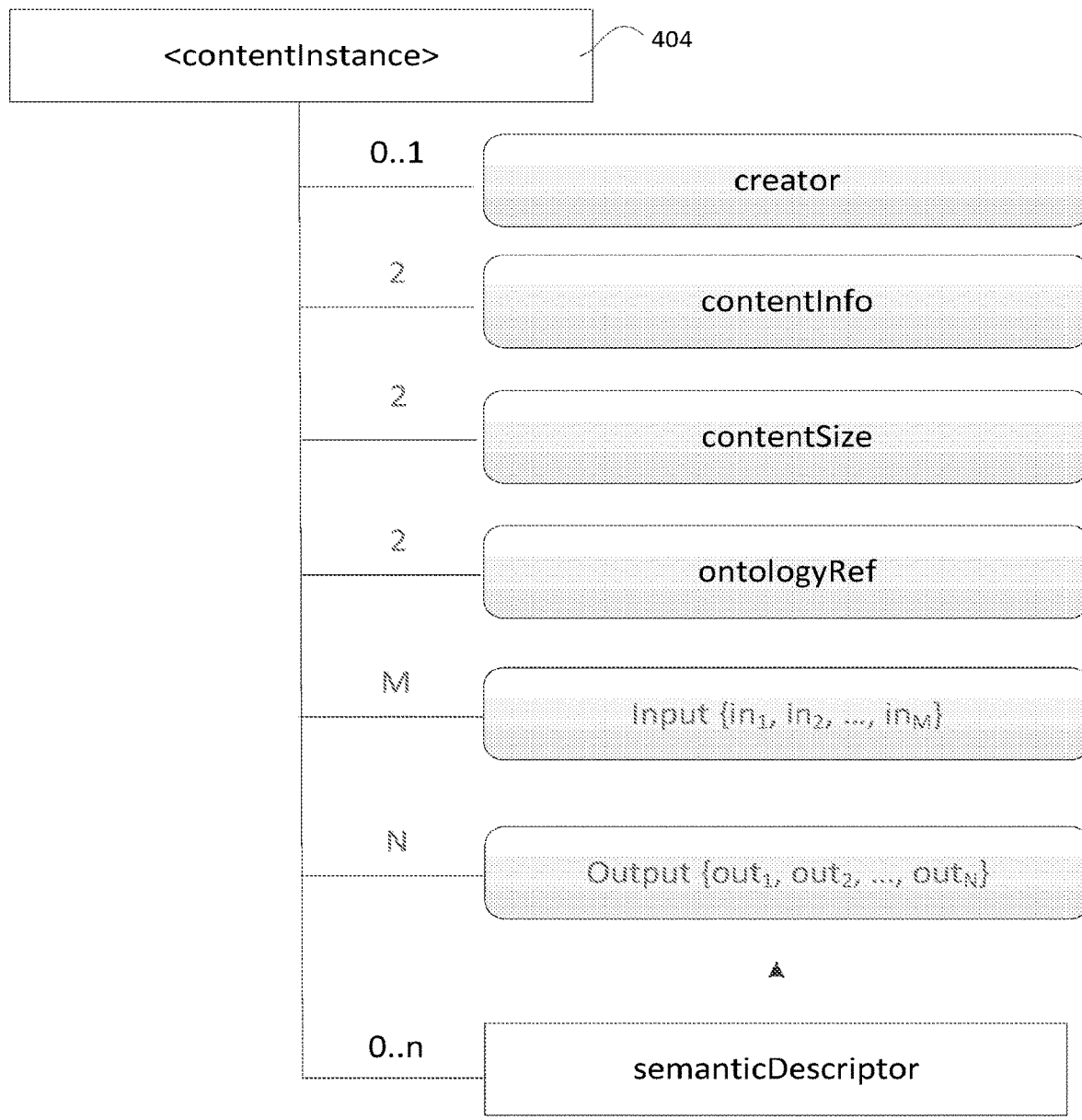
FIG. 14 is a diagram that illustrates a Dimension Resource Structure for a Multi-input and Multi-output Ontology model.

An example of ontology model with input $\{in_1, in_2, \ldots, in_M\}$ and output $\{out_1, out_2, out_N\}$ is illustrated in FIG. 14. In this scenario, the dimension 1 (i.e. input $\{in_1, in_2, in_M\}$) and dimension 2 (i.e. output $\{out_1, out_2, out_N\}$) may or may not be strongly associated, e.g. dimension 1 input has M elements and dimension 2 output has N elements. If the association or correlation is not required between input and output, an individual RESTful (e.g. CREATE, RETRIEVE, UPDATE, DELATE, etc.) operation may be applied to either dimension 1 (i.e. input $\{in_1, in_2, \ldots, in_M\}$) or dimension 2 (i.e. output $\{out_1, out_2, \ldots, out_N\}$) separately. However, one operation shall always be applied to all the elements of a dimension, i.e. the set input $\{in_1, in_2, \ldots, in_M\}$ or the set output $\{out_1, out_2, \ldots, out_N\}$.

It is understood that the data structures of FIGS. 4-6, 9-10, 12-15 and their associated functionality may be implemented in the form of software (i.e., computer-executable instructions) stored in a memory of, and executing on a processor of, a node of an M2M network (e.g., a server, gateway, device, or other computer system), such as one of those illustrated in FIG. 16C or 16D described below.

GUI

Figure 15A:
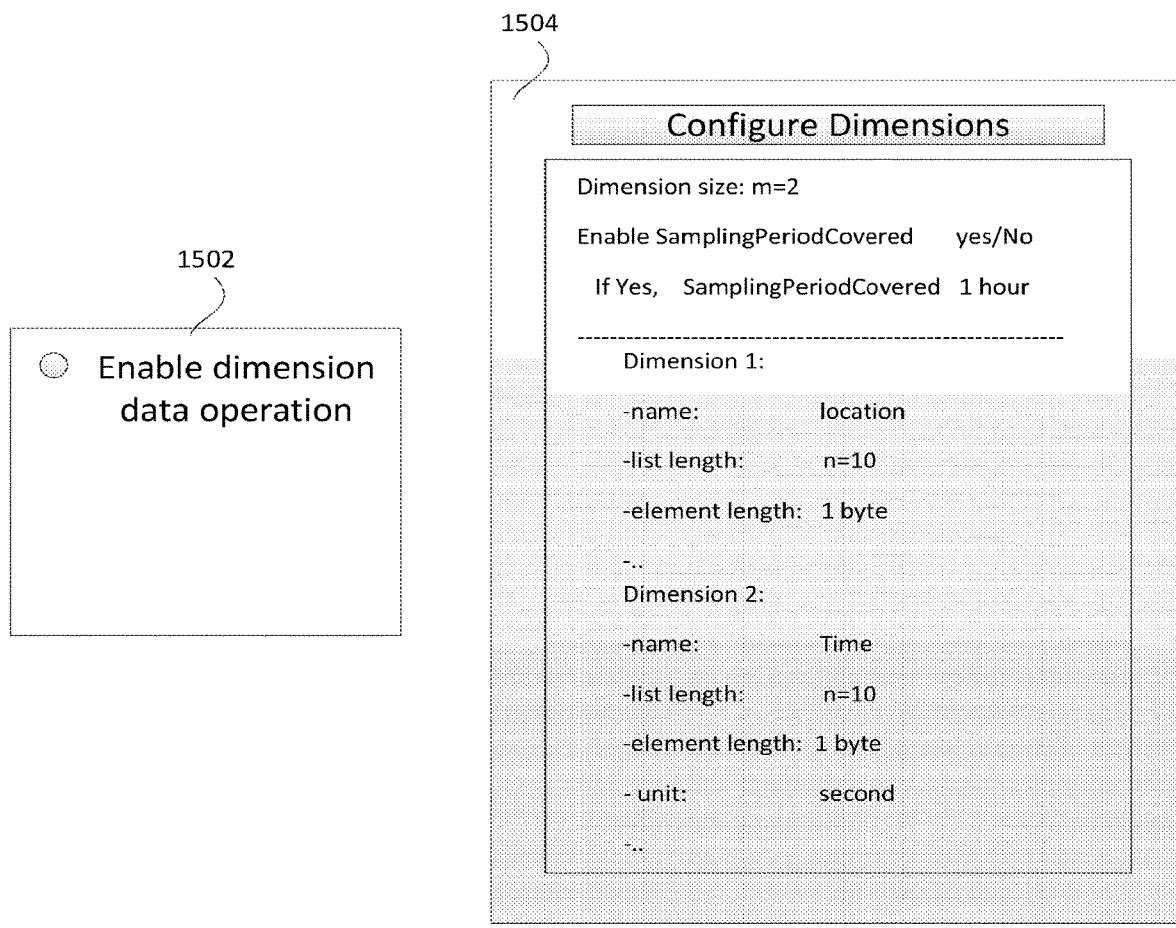

FIG. 15A is an example of the GUI for user to pre-configure Dimension Data. Interfaces, such as Graphical User Interfaces (GUIs), can be used to assist user to control and/or configure functionalities related to modeling of multidimensional data. FIG. 15A is a diagram that illustrates an interface 1502 that allows a user to enable multidimensional data and interface 1504 that allows for the configuration of multidimensional data.

Figure 15B:
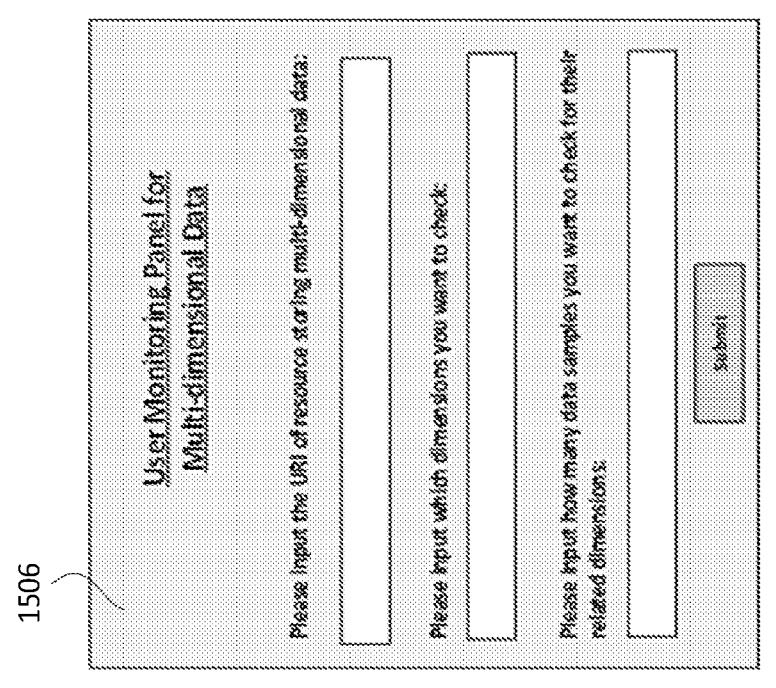

FIG. 15B shows an interface 1506 which is a user monitoring panel for multi-dimensional data. Interface 1506 allows for the input of a URI of a resource storing multi-dimensional data; input of dimensions to be checked and input of the number of data samples to be checked.

It is to be understood that interfaces 1502, 1504 and 1506 can be produced using displays such as those shown in FIGS. 16C-D described below.

Example M2M/IoT/WoT Communication System

The various techniques described herein may be implemented in connection with hardware, firmware, software or, where appropriate, combinations thereof. Such hardware, firmware, and software may reside in apparatuses located at various nodes of a communication network. The apparatuses may operate singly or in combination with each other to effect the methods described herein. As used herein, the terms "apparatus," "network apparatus," "node," "device," and "network node" may be used interchangeably.

The service layer may be a functional layer within a network service architecture. Service layers are typically situated above the application protocol layer such as HTTP, CoAP or MQTT and provide value added services to client applications. The service layer also provides an interface to core networks at a lower resource layer, such as for example, a control layer and transport/access layer. The service layer supports multiple categories of (service) capabilities or functionalities including a-service definition, service run-time enablement, policy management, access control, and service clustering. Recently, several industry standards bodies, e.g., oneM2M, have been developing M2M service layers to address the challenges associated with the integration of M2M types of devices and applications into deployments such as the Internet/Web, cellular, enterprise, and home networks. A M2M service layer can provide applications and/or various devices with access to a collection of or a set of the above mentioned capabilities or functionalities, supported by the service layer, which can be referred to as a CSE or SCL. A few examples include but are not limited to security, charging, data management, device management, discovery, provisioning, and connectivity management which can be commonly used by various applications. These capabilities or functionalities are made available to such various applications via APIs which make use of message formats, resource structures and resource representations defined by the M2M service layer. The CSE or SCL is a functional entity that may be implemented by hardware and/or software and that provides (service) capabilities or functionalities exposed to various applications and/or devices (i.e., functional interfaces between such functional entities) in order for them to use such capabilities or functionalities.

FIG. 16A is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, M2M gateway, M2M server, or M2M service platform may be a component or node of the IoT/WoT as well as an IoT/WoT service layer, etc. Communication system 10 can be used to implement functionality of the disclosed embodiments and can include functionality and logical entities such as common service layer 102, and CSFs, originators 702 and receiver 704 and logical entities for data structures including the data structures of FIGS. 4-6, 9-10, 12-15 and logical entities for interfaces 1502, 1504 and 1506.

As shown in FIG. 16A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may be comprised of multiple access networks that provide content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 16A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain and Infrastructure Domain may both comprise a variety of different network nodes (e.g., servers, gateways, device, and the like). For example, the Field Domain may include M2M gateways 14 and terminal devices 18. It will be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals, using communications circuitry, via the communication network 12 or direct radio link. A M2M gateway 14 allows wireless M2M devices (e.g. cellular and non-cellular) as well as fixed network M2M devices (e.g., PLC) to communicate either through operator networks, such as the communication network 12 or direct radio link. For example, the M2M terminal devices 18 may collect data and send the data, via the communication network 12 or direct radio link, to an M2M application 20 or other M2M devices 18, The M2M terminal devices 18 may also receive data from the M2M application 20 or an M2M terminal device 18. Further, data and signals may be sent to and received from the M2M application 20 via an M2M service layer 22, as described below. M2M terminal devices 18 and gateways 14 may communicate via various networks including, cellular, WLAN, WPAN (e.g., Zigbee, 6LoWPAN, Bluetooth), direct radio link, and wireline for example.

Exemplary M2M terminal devices 18 include, but are not limited to, tablets, smart phones, medical devices, temperature and weather monitors, connected cars, smart meters, game consoles, personal digital assistants, health and fitness monitors, lights, thermostats, appliances, garage doors and other actuator-based devices, security devices, and smart outlets.

Referring to FIG. 16B, the illustrated M2M service layer 22 in the field domain provides services for the M2M application 20, M2M gateway devices 14, and M2M terminal devices 18 and the communication network 12. Communication network 12 can be used to implement functionality of the disclosed embodiments and can include functionality and logical entities such as common service layer 102, and CSFs, originators 702 and receiver 704 and logical entities for data structures including the data structures of FIGS. 4-6, 9-10, 12-15 and logical entities for interfaces 1502, 1504 and 1506. The M2M service layer 22 may be implemented by one or more servers, computers, devices, virtual machines (e.g. cloud/storage farms, etc.) or the like, including for example the devices illustrated in FIGS. 16C and 16D described below. It will be understood that the M2M service layer 22 may communicate with any number of M2M applications, M2M gateways 14, M2M terminal devices 18, and communication networks 12 as desired. The M2M service layer 22 may be implemented by one or more nodes of the network, which may comprises servers, computers, devices, or the like. The M2M service layer 22 provides service capabilities that apply to M2M terminal devices 18, M2M gateways 14, and M2M applications 20. The functions of the M2M service layer 22 may be implemented in a variety of ways, for example as a web server, in the cellular core network, in the cloud, etc.

Similar to the illustrated M2M service layer 22, there is the M2M service layer 22' in the Infrastructure Domain. M2M service layer 22' provides services for the M2M application 20' and the underlying communication network 12 in the infrastructure domain. M2M service layer 22' also provides services for the M2M gateways 14 and M2M terminal devices 18 in the field domain. It will be understood that the M2M service layer 22' may communicate with any number of M2M applications, M2M gateways and M2M devices. The M2M service layer 22' may interact with a service layer by a different service provider. The M2M service layer 22' by one or more nodes of the network, which may comprises servers, computers, devices, virtual machines (e.g., cloud computing/storage farms, etc.) or the like.

Referring also to FIG. 16B, the M2M service layers 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layers 22 and 22' also enable M2M applications 20 and 20' to communicate through networks 12 in connection with the services that the service layers 22 and 22' provide.

The methods of the present application may be implemented as part of a service layer 22 and 22'. The service layer 22 and 22' is a software middleware layer that supports value-added service capabilities through a set of Application Programming Interfaces (APIs) and underlying networking interfaces. Both ETSI M2M and oneM2M use a service layer that may contain the connection methods of the present application. ETSI M2M's service layer is referred to as the Service Capability Layer (SCL). The SCL may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e. service capabilities). An instantiation of a set of one or more particular types of CSFs is referred to as a Common Services Entity (CSE) which can be hosted on different types of network nodes (e.g. infrastructure node, middle node, application-specific node). Further, connection methods of the present application can implemented as part of an M2M network that uses a Service Oriented Architecture (SOA) and/or a resource-oriented architecture (ROA) to access services such as the connection methods of the present application.

In some embodiments, M2M applications 20 and 20' may be used in conjunction with the disclosed systems and methods. The M2M applications 20 and 20' may include the applications that interact with the UE or gateway and may also be used in conjunction with other disclosed systems and methods.

In one embodiment, the logical entities such as common service layer 102, and CSFs, originators 702 and receiver 704 and logical entities for data structures including the data structures of FIGS. 4-6, 9-10, 12-15 and logical entities for interfaces 1502, 1504 and 1506 may be hosted within a M2M service layer instance hosted by an M2M node, such as an M2M server, M2M gateway, or M2M device, as shown in FIG. 16B. For example, the logical entities such as common service layer 102, and CSFs, originators 702 and receiver 704 and logical entities for data structures including the data structures of FIGS. 4-6, 9-10, 12-15 and logical entities for interfaces 1502, 1504 and 1506 may comprise an individual service capability within the M2M service layer instance or as a sub-function within an existing service capability.

The M2M applications 20 and 20' may include applications in various industries such as, without limitation, transportation, health and wellness, connected home, energy management, asset tracking, and security and surveillance. As mentioned above, the M2M service layer, running across the devices, gateways, servers and other nodes of the system, supports functions such as, for example, data collection, device management, security, billing, location tracking/geofencing, device/service discovery, and legacy systems integration, and provides these functions as services to the M2M applications 20 and 20'.

Generally, the service layers 22 and 22' define a software middleware layer that supports value-added service capabilities through a set of Application Programming Interfaces (APIs) and underlying networking interfaces. Both the ETSI M2M and oneM2M architectures define a service layer. ETSI M2M's service layer is referred to as the Service Capability Layer (SCL). The SCL may be implemented in a variety of different nodes of the ETSI M2M architecture. For example, an instance of the service layer may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e., service capabilities). An instantiation of a set of one or more particular types of CSFs is referred to as a Common Services Entity (CSE) which can be hosted on different types of network nodes (e.g. infrastructure node, middle node, application-specific node). The Third Generation Partnership Project (3GPP) has also defined an architecture for machine-type communications (MTC). In that architecture, the service layer, and the service capabilities it provides, are implemented as part of a Service Capability Server (SCS). Whether embodied in a DSCL, GSCL, or NSCL of the ETSI M2M architecture, in a Service Capability Server (SCS) of the 3GPP MTC architecture, in a CSF or CSE of the oneM2M architecture, or in some other node of a network, an instance of the service layer may be implemented as a logical entity (e.g., software, computer-executable instructions, and the like) executing either on one or more stand-alone nodes in the network, including servers, computers, and other computing devices or nodes, or as part of one or more existing nodes. As an example, an instance of a service layer or component thereof may be implemented in the form of software running on a network node (e.g., server, computer, gateway, device or the like) having the general architecture illustrated in FIG. 16C or FIG. 16D described below.

Further, logical entities such as common service layer 102, and CSFs, originators 702 and receiver 704 and logical entities for data structures including the data structures of FIGS. 4-6, 9-10, 12-15 and logical entities for interfaces 1502, 1504 and 1506 can implemented as part of an M2M network that uses a Service Oriented Architecture (SOA) and/or a Resource-Oriented Architecture (ROA) to access services of the present application.

FIG. 16C is a block diagram of an example hardware/software architecture of a M2M network node 30, such as an M2M device 18, an M2M gateway 14, an M2M server, or the like. The node 30 can execute or include logical entities such as common service layer 102, and CSFs, originators 702 and receiver 704 and logical entities for data structures including the data structures of FIGS. 4-6, 9-10, 12-15 and logical entities for interfaces 1502, 1504 and 1506. The device 30 can be part of an M2M network as shown in FIG. 16A-B or part of a non-M2M network. As shown in FIG. 16C, the M2M node 30 may include a processor 32, non-removable memory 44, removable memory 46, a speaker/microphone 38, a keypad 40, a display, touchpad, and/or indicators 42, a power source 48, a global positioning system (GPS) chipset 50, and other peripherals 52. The node 30 may also include communication circuitry, such as a transceiver 34 and a transmit/receive element 36. It will be appreciated that the M2M node 30 may include any sub-combination of the foregoing elements while remaining consistent with an embodiment. This node may be a node that implements the SMSF functionality described herein.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 may execute computer-executable instructions stored in the memory (e.g., memory 44 and/or memory 46) of the node in order to perform the various required functions of the node. For example, the processor 32 may perform signal coding, data processing, power control, input/output processing, and/or any other functionality that enables the M2M node 30 to operate in a wireless or wired environment. The processor 32 may run application-layer programs (e.g., browsers) and/or radio access-layer (RAN) programs and/or other communications programs. The processor 32 may also perform security operations such as authentication, security key agreement, and/or cryptographic operations, such as at the access-layer and/or application layer for example.

As shown in FIG. 16C, the processor 32 is coupled to its communication circuitry (e.g., transceiver 34 and transmit/receive element 36). The processor 32, through the execution of computer executable instructions, may control the communication circuitry in order to cause the node 30 to communicate with other nodes via the network to which it is connected. In particular, the processor 32 may control the communication circuitry in order to perform the transmitting and receiving steps described herein and in the claims. While FIG. 16C depicts the processor 32 and the transceiver 34 as separate components, it will be appreciated that the processor 32 and the transceiver 34 may be integrated together in an electronic package or chip.

The transmit/receive element 36 may be configured to transmit signals to, or receive signals from, other M2M nodes, including M2M servers, gateways, device, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 16C as a single element, the M2M node 30 may include any number of transmit/receive elements 36. More specifically, the M2M node 30 may employ MIMO technology. Thus, in an embodiment, the M2M node 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the M2M node 30 may have multi-mode capabilities. Thus, the transceiver 34 may include multiple transceivers for enabling the M2M node 30 to communicate via multiple RATS, such as UTRA and IEEE 802.11, for example.

The processor 32 may access information from, and store data in, any type of suitable memory, such as the non-removable memory 44 and/or the removable memory 46. For example, the processor 32 may store session context in its memory, as described above. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the M2M node 30, such as on a server or a home computer. The processor 32 may be configured to control lighting patterns, images, or colors on the display or indicators 42 to reflect the status of an M2M service layer session migration or sharing or to obtain input from a user or display information to a user about the node's session migration or sharing capabilities or settings. In another example, the display may show information with regard to a session state. The current disclosure defines a RESTful user/application API in the oneM2M embodiment. A graphical user interface, which may be shown on the display, may be layered on top of the API to allow a user to interactively establish and manage an E2E session, or the migration or sharing thereof, via the underlying service layer session functionality described herein.

The processor 32 may receive power from the power source 48, and may be configured to distribute and/or control the power to the other components in the M2M node 30. The power source 48 may be any suitable device for powering the M2M node 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the M2M node 30. It will be appreciated that the M2M node 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include various sensors such as an accelerometer, biometrics (e.g., fingerprint) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The node 30 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The node 30 may connect to other components, modules, or systems of such apparatuses or devices via one or more interconnect interfaces, such as an interconnect interface that may comprise one of the peripherals 52. Alternately, the node 30 may comprise apparatuses or devices, such as a sensor, consumer electronics, a wearable device such as a smart watch or smart clothing, a medical or eHealth device, a robot, industrial equipment, a drone, a vehicle such as a car, truck, train, or airplane.

FIG. 16D is a block diagram of an exemplary computing system 90 which may also be used to implement one or more nodes of an M2M network, such as an M2M server, gateway, device, or other node. Computing system 90 may comprise a computer or server and may be controlled primarily by computer readable instructions, which may be in the form of software, wherever, or by whatever means such software is stored or accessed. Computing system 90 can execute or include logical entities such as common service layer 102, and CSFs, originators 702 and receiver 704 and logical entities for data structures including the data structures of FIGS. 4-6, 9-10, 12-15 and logical entities for interfaces 1502, 1504 and 1506. Computing system 90 can be an M2M device, user equipment, gateway, UE/GW or any other nodes including nodes of the mobile care network, service layer network application provider, terminal device 18 or an M2M gateway device 14 for example. Such computer readable instructions may be executed within a processor, such as central processing unit (CPU) 91, to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 and/or coprocessor 81 may receive, generate, and process data related to the disclosed systems and methods for E2E M2M service layer sessions, such as receiving session credentials or authenticating based on session credentials.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adaptor 97, that may be used to connect computing system 90 to an external communications network, such as network 12 of FIG. 16A and FIG. 16B, to enable the computing system 90 to communicate with other nodes of the network.

User equipment (UE) can be any device used by an end-user to communicate. It can be a hand-held telephone, a laptop computer equipped with a mobile broadband adapter, or any other device. For example, the UE can be implemented as the M2M terminal device 18 of FIGS. 16A-B or the device 30 of FIG. 16 C.

It is understood that any or all of the systems, methods, and processes described herein may be embodied in the form of computer executable instructions program code) stored on a computer-readable storage medium which instructions, when executed by a machine, such as a node of an M2M network, including for example an M2M server, gateway, device or the like, perform and/or implement the systems, methods and processes described herein. Specifically, any of the steps, operations or functions described above, including the operations of the gateway, UE, UE/GW, or any of the nodes of the mobile core network, service layer or network application provider, may be implemented in the form of such computer executable instructions. Logical entities such as common service layer 102, and CSFs, originators 702 and receiver 704 and logical entities for data structures including the data structures of FIGS. 4-6, 9-10, 12-15 and logical entities for interfaces 1502, 1504 and 1506 may be embodied in the form of the computer executable instructions stored on a computer-readable storage medium. Computer readable storage media include both volatile and nonvolatile, removable and non-removable media implemented in any non-transitory (i.e., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which can be used to store the desired information and which can be accessed by a computer.

In describing preferred embodiments of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have elements that do not differ from the literal language of the claims, or if they include equivalent elements with insubstantial differences from the literal language of the claims.

What is claimed:

1. An apparatus comprising a processor, a memory, and communication circuitry, the apparatus being connected to a network via its communication circuitry, the apparatus further comprising computer-executable instructions stored in the memory of the apparatus which, when executed by the processor of the apparatus, cause the apparatus to:
   receive, from an originator, a first request to store multidimensional data, in a multidimensional data resource structure of a service in a network, the service supporting service capabilities through a set of Application Programming Interfaces (APIs), wherein the first request comprises a plurality of multidimensional data samples, the plurality of multidimensional data samples having a plurality of dimensions of data, one dimension of the plurality of dimensions of data being time and wherein each multidimensional data sample of the plurality of multidimensional data samples comprises a data item and a data type for each of the plurality of dimensions of data;
   store the plurality of multidimensional data samples in the multidimensional data resource structure, wherein the multidimensional data resource structure includes a sampling period attribute, and wherein only multidimensional data samples that are generated in a last time interval set by the sampling period attribute are stored in the multidimensional data resource structure;
   receive, based on one or more user inputs, a second request to access the generated multidimensional data resource structure for retrieving and updating at least one dimension of the plurality of dimensions of data; and
   cause, via the service and based on the second request, access to the at least one dimension of the plurality of dimensions of data.

2. The apparatus of claim 1, wherein the apparatus validates the plurality of multidimensional data samples.

3. The apparatus of claim 1, wherein the data type comprises a definition of the type of the data item.

4. The apparatus of claim 1, wherein the causing access causes one or more RESTful operations to be applied to each element of the at least one dimension.

5. The apparatus of claim 1, wherein the computer-executable instructions further cause the apparatus to perform operations comprising:
determining whether the originator has access rights to request the creation of the multidimensional data resource structure.

6. The apparatus of claim 1, wherein the computer-executable instructions further cause the apparatus to perform operations comprising:
assigning a resource identifier to each dimension of the plurality of dimensions of data.

7. The apparatus of claim 1, wherein the computer-executable instructions further cause the apparatus to perform operations comprising:
transmitting a response message to the originator indicating that the multidimensional data was stored.

8. A method for use by an apparatus, wherein the apparatus comprises a processor, a memory, and communication circuitry, the apparatus being connected to a network via its communication circuitry, the method comprising:
receiving, from an originator a first request to store multidimensional data, in a multidimensional data resource structure of a service in a network, the service supporting service capabilities through a set of Application Programming Interfaces (APIs), wherein the first request comprises a plurality of multidimensional data samples, the plurality of multidimensional data samples having a plurality of dimensions of data, one dimension of the plurality of dimensions of data being time and wherein each multidimensional data sample of the plurality of multidimensional data samples comprises a data item and data type for each of the plurality of dimensions of data;
storing the plurality of multidimensional data samples in the multidimensional data resource structure, wherein the multidimensional data resource structure includes a sampling period attribute, and wherein only multidimensional data samples that are generated in a last time interval set by the sampling period attribute are stored in the multidimensional data resource structure;
receiving, based on one or more user inputs, a second request to access the generated multidimensional data resource structure for retrieving and updating at least one dimension of the plurality of dimensions of data; and
causing, via the service and based on the second request, access to the at least one dimension of the plurality of dimensions of data.

9. The method of claim 8, wherein the apparatus validates the plurality of multidimensional data samples.

10. The method of claim 8, wherein the data type comprises a definition of the type of the data item.

11. The method of claim 8, wherein the causing access causes one or more RESTful operations to be applied to each element of the at least one dimension.

12. The method of claim 8, further comprising:
determining whether the originator has access rights to request the storing of the multidimensional data.

13. The method of claim 8, further comprising:
assigning a resource identifier to each dimension of the plurality of dimensions of data.

14. A non-transitory computer-readable storage medium storing computer-readable instructions that, when executed by a processor, cause:
receiving, from an originator, a first request to store multidimensional data in a multidimensional data resource structure of a service in a network, the service supporting service capabilities through a set of Application Programming Interfaces (APIs), wherein the first request comprises a plurality of multidimensional data samples, the plurality of multidimensional data samples having a plurality of dimensions of data, one dimension of the plurality of dimensions of data being time and wherein each multidimensional data sample of the plurality of multidimensional data samples comprises a data item and data type for each of the plurality of dimensions of data;
storing the plurality of multidimensional data samples in the multidimensional data resource structure, wherein the multidimensional data resource structure includes a sampling period attribute, and wherein only multidimensional data samples that are generated in a last time interval set by the sampling period attribute are stored in the multidimensional data resource structure;
receiving, based on one or more user inputs, a second request to access the generated multidimensional data resource structure for retrieving and updating at least one dimension of the plurality of dimensions of data; and
causing, via the service and based on the second request, access to the at least one dimension of the plurality of dimensions of data.

15. The non-transitory computer-readable storage medium of claim 14, wherein the apparatus validates the plurality of multidimensional data samples.

16. The non-transitory computer-readable storage medium of claim 14, wherein the data type comprises a definition of the type of the data item.

17. The non-transitory computer-readable storage medium of claim 14, wherein the causing access causes one or more RESTful operations to be applied to each element of the at least one dimension.

* * * * *